US012732757B1

(12) United States Patent
Lu et al.

(10) Patent No.: US 12,732,757 B1

(45) Date of Patent: Sep. 8, 2026

(54) DESKTOP MICROPHONE

(71) Applicant: GUANGDONG DINGCHUANG SMART MANUFACTURING CO., LTD., Dongguan (CN)

(72) Inventors: Jun Lu, Dongguan (CN); Mingjun Li, Dongguan (CN); Jiandong Huang, Dongguan (CN); Kun Yang, Dongguan (CN)

(73) Assignee: GUANGDONG DINGCHUANG SMART MANUFACTURING CO., LTD., Dongguan (CN)

( * ) Notice: Subject to any disclaimer, the term of this patent is extended or adjusted under 35 U.S.C. 154(b) by 0 days.

(21) Appl. No.: 19/537,907

(22) Filed: Feb. 12, 2026

(30) Foreign Application Priority Data

Nov. 14, 2025 (CN) ......................... 202522436745.9

(51) Int. Cl.

| | |
|---|---|
| ***H04R 19/04*** | (2006.01) |
| ***H04R 1/02*** | (2006.01) |
| ***H04R 1/04*** | (2006.01) |
| ***H04R 1/08*** | (2006.01) |
| ***H04R 3/00*** | (2006.01) |

(52) U.S. Cl.

CPC ............... *H04R 19/04* (2013.01); *H04R 1/02* (2013.01); *H04R 1/04* (2013.01); *H04R 1/086* (2013.01); *H04R 3/00* (2013.01)

(58) Field of Classification Search

CPC . H04R 19/04; H04R 1/02; H04R 1/04; H04R 1/086; H04R 3/00; H04R 1/028; H04R 1/083; H04R 1/08; H04R 2201/025; F16M 11/06; F16M 11/08; A47F 5/04

See application file for complete search history.

(56) References Cited

FOREIGN PATENT DOCUMENTS

| | | | | |
|---|---|---|---|---|
| CN | 208572334 U | * | 3/2019 | ............... H04R 1/08 |
| CN | 208863033 U | * | 5/2019 | ............... H04R 1/08 |
| CN | 114466268 A | * | 5/2022 | ............... H04R 1/08 |

* cited by examiner

*Primary Examiner* — Angelica M McKinney

(74) *Attorney, Agent, or Firm* — HOWARD M COHN and Associates, LLC

(57) ABSTRACT

A desktop microphone includes a housing assembly, a support assembly, a control component, and an electrical connector. The support assembly includes a first bracket including a U-shaped bracket structure and a port socket, the U-shaped bracket structure comprises two first ends facing upwards and a second end opposite to the two first ends, the two first ends of the U-shaped bracket structure being rotatably connected to the shell, and the port socket being set at the second end of the U-shaped bracket structure; the U-shaped bracket structure comprises a wire slot, and the port socket comprises a second accommodating chamber in communication with the wire slot.

20 Claims, 30 Drawing Sheets

DESKTOP MICROPHONE

CROSS-REFERENCE TO RELATED APPLICATIONS

The present application claims a priority of Chinese patent application CN2025224367459, entitled "DESKTOP MICROPHONE", filed on Nov. 14, 2025, the entire disclosures of which are incorporated herein by reference.

TECHNICAL FIELD

The present application relates to the field of microphone technology, particularly to a desktop microphone.

BACKGROUND

Desktop microphones are primarily designed for use on a desk, unlike handheld, lavalier, or head-wearing microphones, it typically does not require holding or wearing, but instead stands stably on a desk via a base, stand, or arm mount to capture audio signals. Desktop microphones are widely favored by users for their broad range of applications, including offices, recording studios, and live streaming setups.

In related technologies, desktop microphones usually include a housing and a wired interface module, the wired interface module is installed on the housing and connected to external devices through a data cable for wired communication. In the actual use of desktop microphones, users will rotate the housing according to their actual needs to rotate the pickup component of the desktop microphone to the appropriate angle, so that the pickup component of the desktop microphone can effectively collect the user's audio. However, the rotation of the shell will drive the wired interface module connected to it to rotate together, causing the data cables connected to the wired interface module to be scattered or tangled, which is not convenient for users to use.

SUMMARY

This application provides a desktop microphone that can solve the problem in related technologies where the rotation of the housing of the desktop microphone drives the wired interface module connected to it to rotate together, resulting in messy distribution or entanglement of data cables connected to the wired interface module, which is inconvenient for users to use.

A desktop microphone comprises a housing assembly, a support assembly, a control component, and an electrical connector.

The housing assembly comprises a shell defining a first accommodating chamber.

The support assembly comprises a first bracket including a U-shaped bracket structure and a port socket, the U-shaped bracket structure comprises two first ends facing upwards and a second end opposite to the two first ends, the two first ends of the U-shaped bracket structure being rotatably connected to the shell, and the port socket being set at the second end of the U-shaped bracket structure; the U-shaped bracket structure comprises a wire slot, and the port socket comprises a second accommodating chamber in communication with the wire slot.

The control component comprises a first circuit board, and a second circuit board, the first circuit board is arranged in the first accommodating chamber, the second circuit board is arranged in the second accommodating chamber.

The electrical connector is partially arranged in the wire slot, one end of the electrical connector is electrically connected to the second circuit board, the other end of the electrical connector extends into the shell and is electrically connected to the first circuit board.

Based on the desktop microphone of this application, by designing the wired interface module on the port seat of the first chassis, compared to directly designing the wired interface module on the housing, the data cable connected to the wired interface module will not rotate with the housing during the rotation of the housing, so as not to cause the data cable to be scattered or tangled with each other, which is convenient for users to use.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DRAWING REFERENCES

Figure 1:
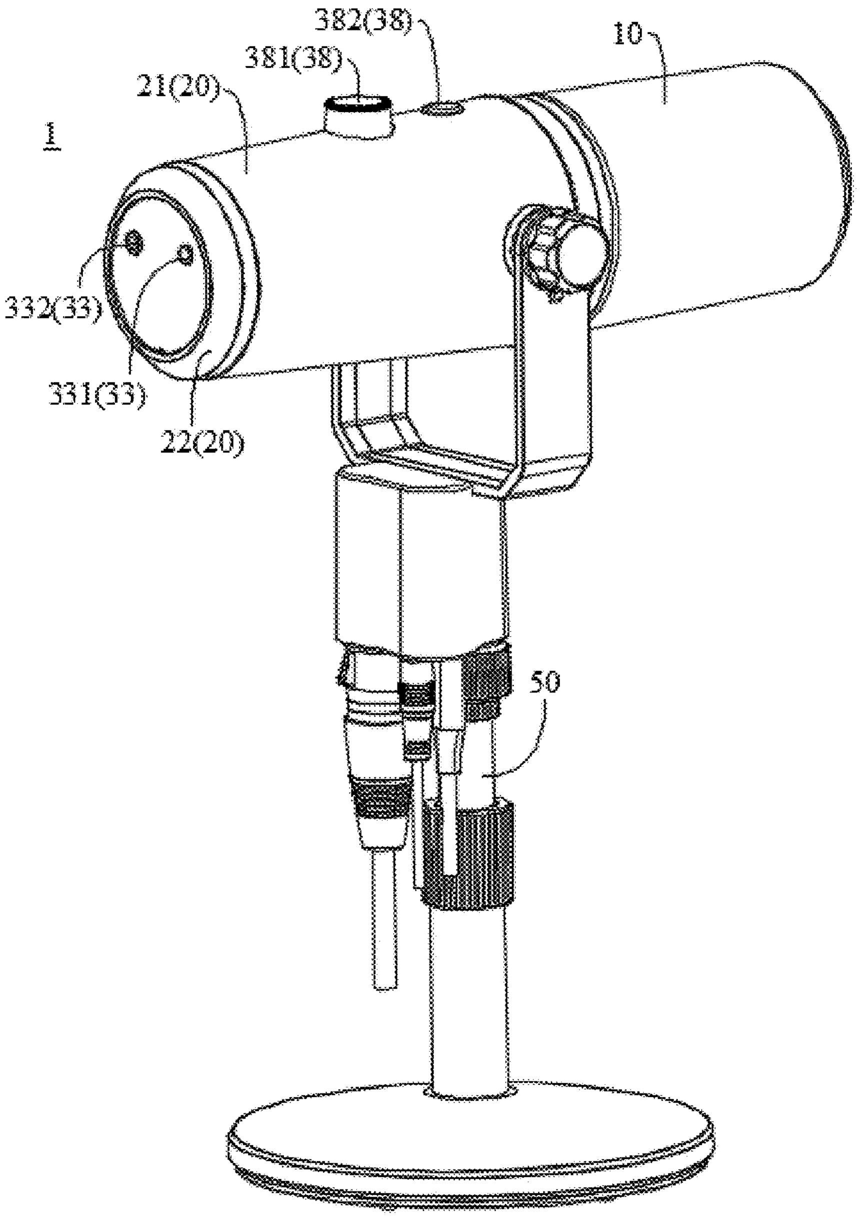
FIG. 1 is a schematic view of a desktop microphone according to an embodiment of the present disclosure.
Figure 2:
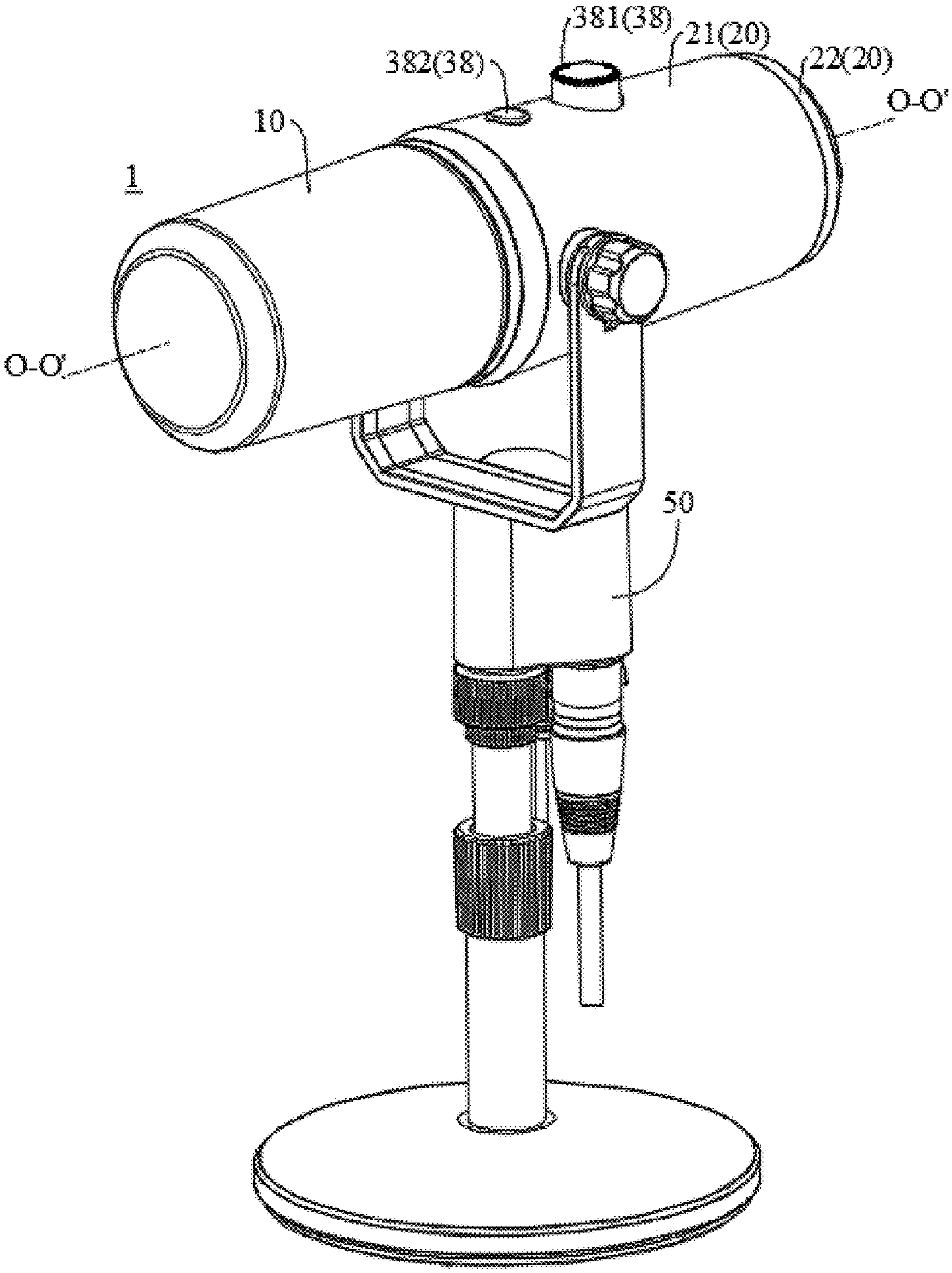
FIG. 2 is another schematic view of the desktop microphone of FIG. 1.

Elements and References: desktop microphone 1; sound pickup assembly 10; microphone head 11; windproof cover 12; support 13; support ring 14; housing assembly 20, control component 30, wireless assembly 40; shell 21; cover 22; first accommodating chamber 23; second accommodating chamber 21*a*; bottom wall 211; surrounding wall 212; first through hole 211*a*; opening 211*b*; second perforation 212*a*; third through hole 212*b*; second through hole 22*a*; third perforation 22*b*; projection 24; first mounting hole 24*a*; first threaded hole 24*al*; second mounting hole 24*b*; second threaded hole 24*b*1; positioning protrusion 24*c*; mounting bracket 25; transparent member 26; control component 30; first circuit board 31; fourth through hole 31*a*; fifth through hole 31*b*; positioning hole 31*c*; side edge 31*d*; second circuit board 32; first function switch 33; power switch 331; recording switch 332; third circuit board 34; fourth circuit board 35; circular conductive plate 36; fifth circuit board 37; second function switch 38; gain adjustment knob 381; noise reduction switch 382; connector member 391; detection unit 392; metal elastic body 3921; conductive foam 3922; first conductive circuit 40*a*; second conductive circuit 40*b*; transmitting unit 41; receiving unit 42; support assembly 50; first bracket 51; U-shaped bracket structure 511; wire slot 511*a*; U-shaped bracket 5111; first perforation 5111*a*; locking bolt 5112; wire hole 5112*a*; locking nut 5113; elastic shim 5114; buffer pad 5115; covering plate 5116; connecting part 5117; port socket 512; third accommodating chamber 512*a*; second bracket 52; base 53; first pipe section 521, second pipe section 522, third pipe section 523, fourth pipe section 524, fifth pipe section 525, sixth pipe section 526, seventh pipe section 527; electrical connector 60; flexible circuit board 61; conductive pin 62; wired interface module 70; XLR interface 71; type-C interface 72; headphone interface 73; battery 80; light emitting assembly 90; sixth circuit board 91; light emitting beads 92; first fixing member 93; first screw 931; second fixing member 94; second screw 941; flexible gasket 95; controller 30*a*; capacitor 30*c*; detection circuit 30*d*; conductive component 30*e*; conductive circuit 40*d*; ceramic dielectric antennas 40*e*; metal antenna 40*f*; first anti slip pattern 522*a*; second anti slip pattern 523*a*; third anti slip pattern 526*a*; external thread 527*a*; third threaded hole 53*a*; base body 531; anti slip pad 532; adhesive layer 533; wire 63.

DETAILED DESCRIPTION OF THE EMBODIMENTS

The accompanying drawings in the embodiment of the present disclosure are combined, The technical scheme in the embodiment of the present disclosure is clearly and completely described, Obviously, the described embodiment is only a part of the embodiment of the present disclosure, but not all embodiments are based on the embodiment of the present disclosure, and all other embodiments obtained by ordinary technicians in the field on the premise of not doing creative work belong to the protection range of the present disclosure.

In order to make the above objectives, features, and advantages of the present application more obvious and understandable, the following will provide further detailed explanations of the present application in conjunction with the accompanying drawings and specific implementation methods.

Referring to FIGS. 1-33, the present embodiment proposes a desktop microphone 1 that can ensure good signal transmission performance while pursuing texture.

Referring to FIGS. 1-6, the desktop microphone 1 includes a housing assembly 20, a control component 30, a wireless assembly 40, a support assembly 50 and a wired interface module 70. The housing assembly 20 includes a shell 21, a cover 22, and a mounting bracket 25. The cover 22 is connected to the shell 21, and the cover 22 and the shell 21 cooperatively form a first accommodating chamber 23, and the shell 21 further defines a second accommodating chamber 21*a*. The shell 21 has a first through hole 211*a* in communication with the first accommodating chamber 23, and the cover 22 has a second through hole 22*a* in communication with the first accommodating chamber 23. The mounting bracket 25 is connected to the shell 21, and at least part of the mounting bracket 25 is located in the second accommodating chamber 21*a*.

The control component 30 includes a first circuit board 31 located at least partially within the first accommodating chamber 23, a second circuit board 32, a third circuit board 34 and a first function switch 33. The second circuit board 32 is mounted on the mounting bracket 25. The first function switch 33 extends through the first through hole 211*a* and the second through hole 22*a*, to be electrically connected to the second circuit board 32 and configured for generating corresponding electrical signals under user operation, the control component 30 has a controller 30*a* configured for controlling the desktop microphone 1 to perform different functions according to the electrical signals.

The shell 21 is rotatably connected to the support assembly 50. The third circuit board 34 is located within the support assembly 50, and is electrically connected to the second circuit board 32. The wired interface module 70 is mounted in the support assembly 50, and is electrically connected to the third circuit board 34.

The shell 21 contains metal material, the cover 22 contains non-metal material. The wireless assembly 40 is installed on the first circuit board 31 and electrically connected to the first circuit board 31, the wireless assembly 40 is used for wireless communication with external devices to transmit audio signals from the desktop microphone 1 to external devices and/or receive audio signals from external devices. More detail of the wireless assembly 40 is specially described below.

As shown in FIGS. 1-6, desktop microphone 1 includes the housing assembly 20, the control component 30, the wireless assembly 40, the support assembly 50 and the wired interface module 70. The housing assembly 20 serves as the shell component of desktop microphone 1, and includes the shell 21 and the cover 22. Preferably, the shell 21 is made of metal material, for example, the material of the shell 21 can include but is not limited to aluminum alloy, stainless steel, or zinc alloy; and the cover 22 is made of non-metallic materials, such as but not limited to plastic, silicone, rubber, or glass.

The specific connection method between the cover 22 and the shell 21 is not limited here, and designers can make reasonable designs according to actual needs; for example, the cover 22 can be, but is not limited to, detachably connected to the shell 21 through at least one of screw connection, card connection, or plug connection; for another example, the cover 22 can also, but is not limited to, be non-removably connected to the shell 21 through adhesive or riveting.

The mounting bracket 25 is connected to the shell 21, and at least part of the mounting bracket 25 is located in the second accommodating chamber 21*a*, the specific connection method between the mounting bracket 25 and the shell 21 is not limited here, and designers can make reasonable designs according to actual needs; for example, the mounting bracket 25 can be, but is not limited to, detachably connected to the shell 21 through at least one of screw connection, clamping connection, or plug-in connection; for example, the mounting bracket 25 can also, but is not limited to, be non-removably connected to the shell 21 through adhesive bonding or riveting.

The mounting bracket 25 can be made of metal or non-metal materials, for example, when the mounting bracket 25 is made of metal material, the material of the mounting bracket 25 can include but is not limited to aluminum alloy, stainless steel, or zinc alloy; when the mounting bracket 25 is made of non-metallic materials, the material of the mounting bracket 25 can include but is not limited to plastic, silicone, rubber, or glass.

As shown in FIGS. 1-6, the control component 30 serves as the control module for desktop microphone 1, and includes the first circuit board 31, the second circuit board 32, the third circuit board 34 and the first function switch 33. The first circuit board 31 can be a rigid circuit board, a flexible circuit board, or a combination of a rigid circuit board and a flexible circuit board. It should be noted that when the first circuit board 31 is a flexible circuit board, the control component 30 may also include a reinforcement board, which is set on one side of the flexible circuit board to provide support for the flexible circuit board. A portion of the first circuit board 31 may be located within the first accommodating chamber 23, while the remaining portion of the first circuit board 31 may be located within the second accommodating chamber 21*a* (as described below) of the shell 21.

The second circuit board 32 serves as a main driving board, which can be a rigid circuit board, a flexible circuit board, or a combination of a rigid circuit board and a flexible circuit board; it should be noted that when the second circuit board 32 is a flexible circuit board, the control component 30 may also include a reinforcement board, which is set on one side of the flexible circuit board to provide support for the flexible circuit board.

The second circuit board 32 is mounted on the mounting bracket 25. The specific installation method between the second circuit board 32 and the mounting bracket 25 is not limited here, and designers can make reasonable designs according to actual needs; for example, the second circuit board 32 can be, but is not limited to, detachably connected to the mounting bracket 25 through at least one of screw connection, clamping connection, or plug connection; for another example, the second circuit board 32 can also be non removable connected to the mounting bracket 25 through adhesive bonding or riveting, but not limited to.

The first function switch 33 is electrically connected to the second circuit board 32, and the first function switch 33 extends through the first through hole 211*a* and the second through hole 22*a*, configured for generating corresponding electrical signals under user operation, wherein the first function switch 33 can be a press switch button, and the user can generate the above-mentioned electrical signal by pressing the first function switch 33; the first function switch 33 can also be a rotary switch knob, in which case the user rotates the first function switch 33 to generate the aforementioned electrical signal. The controller 30*a* (decried below) of the control component 30 which is configured for controlling the desktop microphone 1 to perform different functions according to the electrical signals.

The third circuit board 34 can serve as an adapter board, the third circuit board 34 is located within the support assembly 50, and is electrically connected to the second circuit board 32.

The wired interface module 70 serves as a wired interface end of the desktop microphone 1, and can be connected to external devices through wired communication via a data cable. The wired interface module 70 is installed in the support assembly 50 and electrically connected to the third circuit board 34. One end of the wired interface module 70 is exposed to outside. It should be noted that when desktop microphone 1 communicates with external devices through wired interface module 70 via a data cable, the external device can also serve as a power source to charge desktop microphone 1's battery 80 (as described below).

By integrating the wired interface module 70 and the wireless assembly 40 into the same desktop microphone 1, compared to the wired desktop microphone 1 used only for wired transmission and the wireless desktop microphone 1 used only for wireless transmission in related technologies, the pain point of the inability to balance the stability of the wired desktop microphone 1 and the flexibility of the wireless desktop microphone 1 is completely solved, achieving significant advantages of one machine covering the entire scene, one machine replacing two devices, and one machine simplifying the entire link, effectively improving the user experience.

Based on the desktop microphone 1 in the embodiment of the present application, by designing a first through hole 211*a* in the shell 21 that is in communication with the first accommodating chamber 23, a second through hole 22*a* in the cover 22 that is in communication with the first accommodating chamber 23, and a first function switch 33 that is threaded through the first through hole 211*a* and the second through hole 22*a*, the first function switch 33 is set on the end side where the cover 22 is located. Compared with all the function switches of the desktop microphone in related technologies that are directly designed on the side wall of the housing, making reasonable use of the space between the desktop microphone 1 and the end side where the cover 22 is located is conducive to reducing the overall volume of the desktop microphone 1 and avoiding the function switches from being too concentrated on the side wall 212 of the shell 21, which is convenient for user's operation. By designing the second circuit board 32 and the first function switch 33, users can operate the first function switch 33 according to their actual needs to generate corresponding electrical signals, the controller 30*a* of the control component 30 controls the desktop microphone 1 to perform different functions based on different electrical signals to meet the user's usage needs. In addition, sufficient installation space can be reserved on the side wall 212 of the shell 21 for the second function switch 38 of the control component 30 of the desktop microphone 1.

By designing the support assembly 50, which is rotatably connected to the shell 21, on the one hand, it facilitates users to adjust the angle of the housing assembly 20 according to actual needs, and on the other hand, it enables the entire desktop microphone 1 to be placed on an external carrier such as a desktop through the support component 50. By designing the wired interface module 70 on the support component 50, the space on the support component 50 is fully utilized. Compared to designing the wired interface module 70 on the housing assembly 20, it avoids excessive distribution of components on the housing assembly 20 and is beneficial for reducing the volume of the housing assembly 20. By designing the third circuit board 34 as an adapter board, it is used to achieve electrical connection between the wired interface module 70 and the second circuit board 32.

As shown in FIGS. 4-7, the desktop microphone 1 also includes a sound pickup assembly 10, which is used to collect audio signals and is connected to the housing assembly 20. The cover 22 is connected to one end of the shell 21 away from the sound pickup assembly 10. The shell 21 includes a bottom wall 211 and a surrounding wall 212 connected circumferentially to the bottom wall 211, with the bottom wall 211 and the surrounding wall 212 jointly forming the second accommodating chamber 21*a*, and the first accommodating chamber 23 is located between the bottom wall 211 and the cover 22. The first through hole 211*a* is formed in the bottom wall 211.

The sound pickup assembly 10 serves as a sound pickup module of the desktop microphone 1, used to collect audio signals. The specific structure of the sound pickup assembly 10 will be introduced in the following text. The specific connection method between the sound pickup assembly 10 and the housing assembly 20 or the mounting bracket 25 (described below) is not limited here, and designers can make reasonable designs according to actual needs; for example, the sound pickup assembly 10 can be, but is not limited to, detachably connected to inside the housing assembly 20 or the mounting bracket 25 through at least one of screw connection, card connection, or plug connection; for example, the sound pickup assembly 10 can also be non-removable connected to inside the housing assembly 20, specifically the mounting bracket 25 described below through adhesive bonding or riveting, but not limited to.

The specific connection method between the bottom wall 211 and the surrounding wall 212 is not limited here, and designers can make reasonable designs based on actual needs; for example, when the bottom wall 211 and the surrounding wall 212 are in a split structure, the bottom wall 211 can be detachably connected to the surrounding wall 212 through at least one of methods such as screwing, snapping, or plugging, but is not limited to these methods; the bottom wall 211 can also be fixedly connected to the surrounding wall 212 through methods such as gluing or riveting, but is not limited to these methods; another example is when the bottom wall 211 and the surrounding wall 212 are in an integral structure, the bottom wall 211 can be integrally formed with the surrounding wall 212 through methods such as injection molding or 3D printing, but is not limited to these methods.

By designing the cover 22 at the end of the shell 21 facing away from the sound pickup assembly 10, the cover 22 and the sound pickup assembly 10 are separated at both ends of the shell 21, which can reserve sufficient installation space for the second function switch 38 (described below) of the control component 30 of the desktop microphone 1 on the surrounding wall 212 (described below) of the shell 21.

The first function switch 33 is suitable for generating corresponding electrical signals under user operation, and the controller 30*a* of the control component 30 controls the desktop microphone 1 to perform different functions according to different electrical signals. For example, the first function switch 33 includes a power switch 331, which is electrically connected to the second circuit board 32. The power switch 331 is used to generate a power on/off signal (one of the above electrical signals) under the user's operation. The controller 30*a* of the control component 30 controls the power on/off of the desktop microphone 1 based on the power on/off signal.

The first function switch 33 further includes a recording switch 332, which is electrically connected to the second circuit board 32. The recording switch 332 is used to generate a recording on/off signal (another type of electrical signal mentioned above) under the user's operation. The controller 30*a* of the control component 30 controls the recording function of the desktop microphone 1 based on the recording on/off signal.

The wireless assembly 40 serves as the wireless communication terminal for desktop microphone 1. The specific structure of the wireless assembly 40 will be introduced in the following text. The wireless assembly 40 is installed on the first circuit board 31 and electrically connected to the wireless assembly 40. The wireless assembly 40 is used for wireless communication with external devices to transmit/send audio signals from the desktop microphone 1 to external devices and/or receive audio signals from external devices. Among them, external devices can include but are not limited to computers, mobile phones, or other wireless microphones.

For example, when the external device is a computer, the desktop microphone 1 also includes a wireless communicator, which is used to connect with the computer; the wireless assembly 40 (specifically the transmitting unit 41 described below) is wirelessly connected to the computer through a wireless communicator, and sends the audio signal of the desktop microphone 1 to the wireless communicator through wireless transmission. The wireless communicator then sends the audio signal of the desktop microphone 1 to the computer; and/or, the wireless assembly 40 (specifically the receiving unit 42 described below) is wirelessly connected to a computer through a wireless communicator. The computer sends audio signals to the wireless communicator, and the wireless communicator then sends audio signals from the computer to the wireless assembly 40 (specifically the receiving unit 42 described below) through wireless transmission.

For another example, when the external device is another wireless microphone, the wireless assembly 40 (specifically the transmitting unit 41 described below) directly communicates wirelessly with the wireless receiving module of the other wireless microphone to send the audio signal of the desktop microphone 1 to the wireless receiving module of the other wireless microphone through wireless transmission; and/or, the wireless assembly 40 (specifically the receiving unit 42 described below) is directly wirelessly connected to the wireless transmission module of other wireless microphones to receive audio signals from other wireless microphones through wireless transmission.

Based on the desktop microphone 1 in the present embodiment, by designing the shell 21 as a metal material to ensure the texture of the desktop microphone 1, and by designing the cover 22 as a non-metal material, the interference of metal on audio signals can be effectively reduced, ensuring good signal transmission performance of the desktop microphone 1; by designing a wireless assembly 40 that wirelessly communicates with external devices, audio signals can be transmitted wirelessly. Compared to wired desktop microphones in related technologies, this reduces the need for cables and optimizes the environment of application scenarios, especially for live streaming scenarios.

Figure 9:
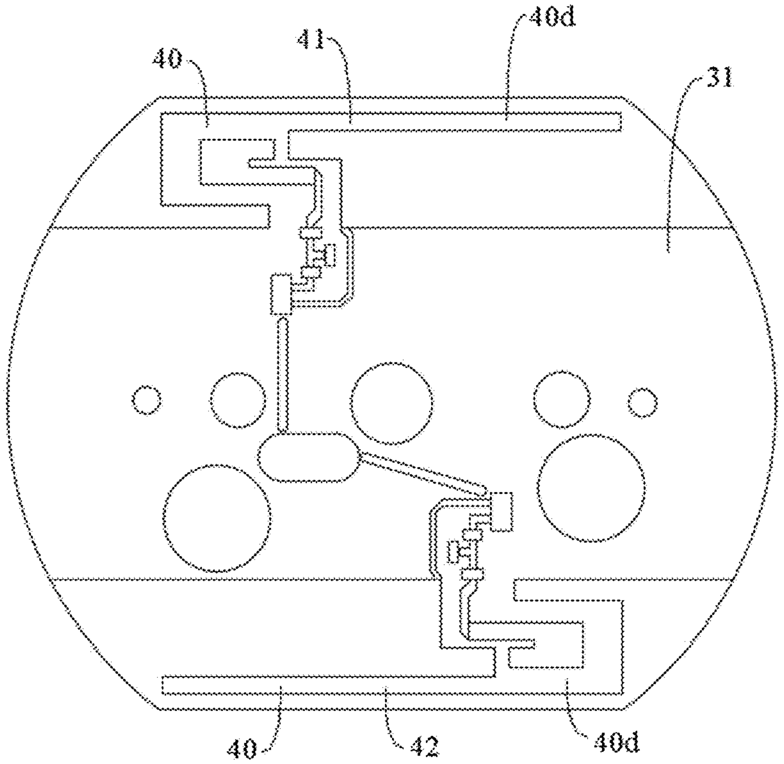
FIG. 9 is a plan view showing a transmitting unit and a receiving unit arranged on the first circuit board.

As shown in FIG. 9, the desktop microphone 1 includes the wireless assembly 40, which is installed on the first circuit board 31 and electrically connected to it. The wireless assembly 40 is configured to wirelessly communicate with external devices to send audio signals from desktop microphone 1 to external devices and receive audio signals from external devices.

Among them, the wireless assembly 40 serves as the wireless communication end for desktop microphone 1, and external devices can include but are not limited to computers, mobile phones, or other wireless microphones.

For example, when the external device is a computer, the desktop microphone 1 also includes a wireless communicator, which is used to connect with the computer; the transmitting unit 41 is wirelessly connected to the computer through a wireless communicator, and sends the audio signal of the desktop microphone 1 to the wireless communicator through wireless transmission, the wireless communicator then sends the audio signal of the desktop microphone 1 to the computer. The receiving unit 42 is wirelessly connected to the computer through a wireless communicator, and the computer sends the audio signal to the wireless communicator, the wireless communicator then sends the audio signal from the computer to the receiving unit 42 through wireless transmission.

For another example, when the external device is another wireless microphone, the transmitting unit 41 directly communicates wirelessly with a wireless receiving module of the another wireless microphone to send the audio signal of the desktop microphone 1 to the wireless receiving module of the another wireless microphone through wireless transmission; the receiving unit 42 directly communicates wirelessly with the wireless sending modules of the another wireless microphones to receive audio signals from the another wireless microphones through wireless transmission.

It can be understood that the desktop microphone 1 in the present embodiment not only has audio collection function, but also has monitoring function. The desktop microphone 1 can be connected to external headphones, and users can use the external headphones to monitor the audio signal in real time. By designing a wireless assembly 40 (specifically the receiving unit 42 described below), the audio signal of the external device is sent to the wireless assembly 40 (specifically the receiving unit 42 described below) in a wireless transmission manner. The wireless assembly 40 (specifically the receiving unit 42 described below) then sends the audio signal to the controller 30*a* of the control component 30, and the controller 30*a* of the control component 30 sends the audio signal to the external headphones to achieve real-time monitoring of the audio signal. It should be noted that external headphones are only used to monitor audio signals and have obtained user permission, and do not involve any other personal privacy data.

As shown in FIG. 9, the wireless assembly 40 includes a transmitting unit 41 and a receiving unit 42 both electrically connected to the first circuit board 31 and are spaced apart from each other. The transmitting unit 41 is used for wireless communication with external devices to send the audio signal of the desktop microphone 1 to the external device. The receiving unit 42 is used for wireless communication with external devices to receive audio signals from external devices. By designing the spacing between the transmitting unit 41 and receiving unit 42, good physical isolation can be achieved between them, effectively reducing the mutual interference of audio signals between the transmitting unit 41 and the receiving unit 42, and improving the signal transmission performance of desktop microphone 1. By designing independent transmitting unit 41 and receiving unit 42, transmitting unit 41 is specifically used to send audio signals from desktop microphone 1 to external devices, which can reduce the bandwidth of the transmitting unit 41 and improve its effective transmission power. The receiving unit 42 is specifically used to receive audio signals from external devices, which can reduce the bandwidth of receiving unit 42 and improve its reception sensitivity. By designing the shell 21 as a metal material, the texture of the desktop microphone 1 is ensured. By designing the cover 22 as a non-metal material, the interference of metal on audio signals can be effectively reduced, ensuring good signal transmission performance of the desktop microphone 1.

Specifically, the specific manifestations of the transmitting unit 41 and the receiving unit 42 can include, but are not limited to, the following situations.

As shown in FIG. 9, in a first scenario, at least one of the transmitting unit 41 and the receiving unit 42 includes a conductive circuit 40*d* integrated into the first circuit board 31. For example, it can be that only the transmitting unit 41 includes the conductive circuit 40*d* integrated into the first circuit board 31, or only the receiving unit 42 includes the conductive circuit 40*d* integrated into the first circuit board 31, or both the transmitting unit 41 and the receiving unit 42 are integrated into the conductive circuit 40*d* integrated into the first circuit board 31. By directly designing at least one of the transmitting unit 41 and the receiving unit 42 as the conductive circuit 40*d* integrated into the first circuit board 31, PCB antenna design can be achieved, which can effectively reduce manufacturing costs and assembly cost.

Figure 10:
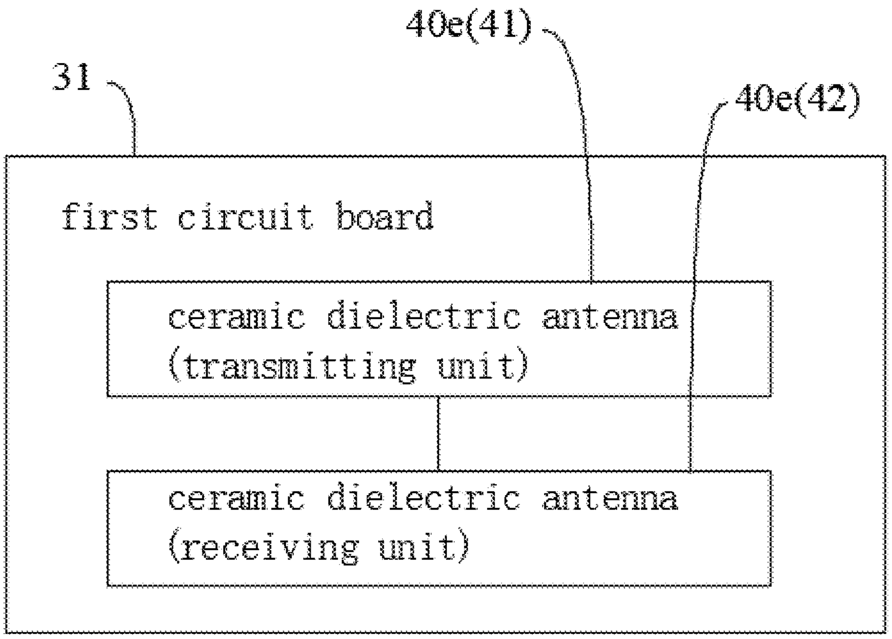
FIG. 10 is a block diagram of a transmitting unit and a receiving unit according to an embodiment.

As shown in FIG. 10, in a second scenario, at least one of the transmitting unit 41 and the receiving unit 42 includes a ceramic dielectric antenna 40*e* arranged on the first circuit board 31. For example, it may be that only the transmitting unit 41 includes the ceramic dielectric antenna 40*e* arranged on the first circuit board 31, or only the receiving unit 42 includes the ceramic dielectric antenna 40*e* arranged on the first circuit board 31, or both the transmitting unit 41 and the receiving unit 42 are ceramic dielectric antennas 40*e* arranged on the first circuit board 31. The raw materials of the ceramic dielectric antenna 40*e* are sufficient, and the specific antenna structure of the ceramic dielectric antenna 40*e* is not limited here. Designers can make reasonable designs according to actual needs, as long as the ceramic dielectric antenna 40*e* is arranged on the first circuit board 31. The ceramic dielectric antenna 40*e* can achieve the transmission and reception of audio signals.

Figure 11:
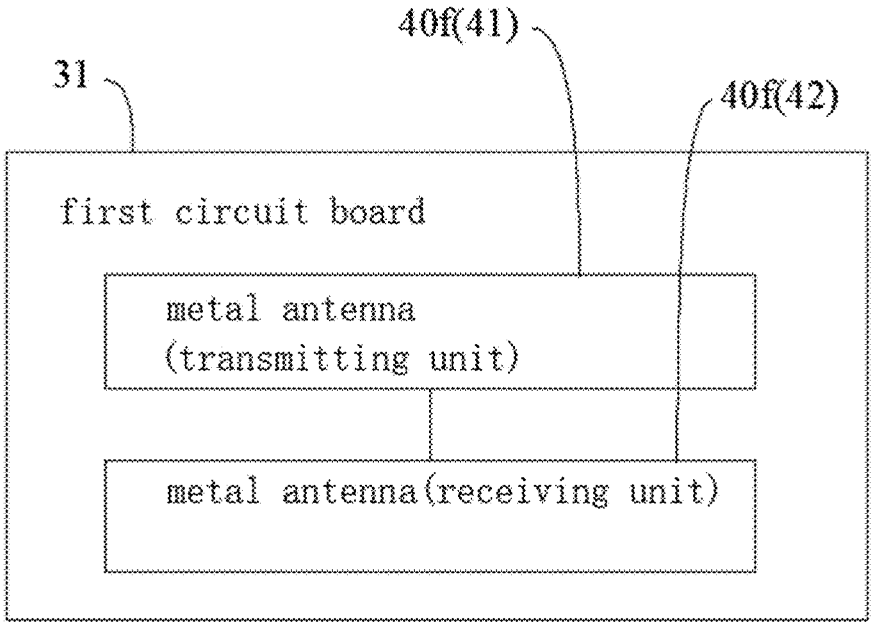
FIG. 11 is a block diagram of another transmitting unit and a receiving unit according to an embodiment.
Figure 12:
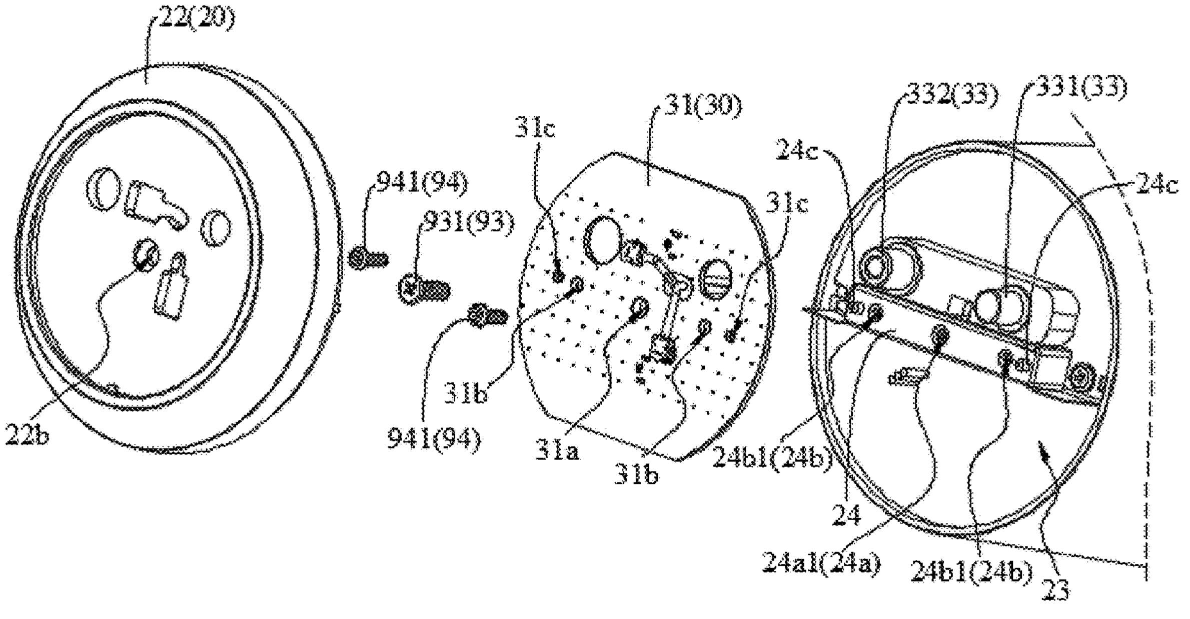
FIG. 12 is another partially exploded view showing the cover, the first circuit board and the protrusion.
Figure 13:
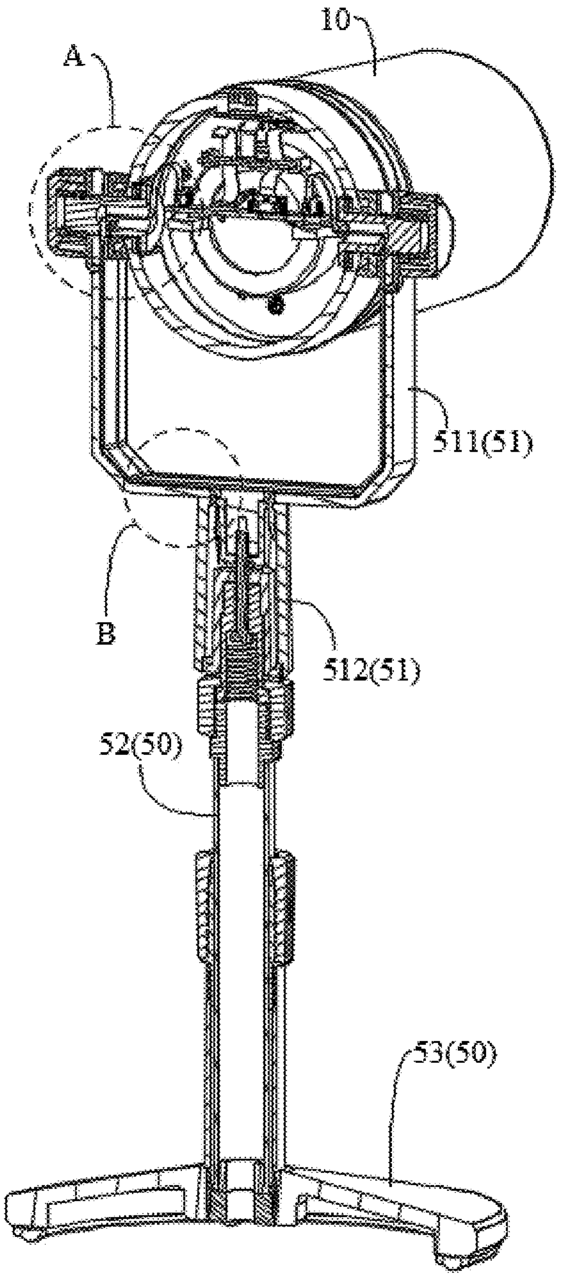
FIG. 13 is a cross-sectional view of the desktop microphone of FIG. 1.

As shown in FIG. 11, in a third scenario, at least one of the transmitting unit 41 and the receiving unit 42 includes a metal antenna **40*f* arranged on the first circuit board 31. For example, it may be that only the transmitting unit 41 includes the metal antenna 40*f* arranged on the first circuit board 31, only the receiving unit 42 includes the metal antenna 40*f* arranged on the first circuit board 31, or both the transmitting unit 41 and the receiving unit 42 include the metal antenna 40*f* arranged on the first circuit board 31. The material of the metal antenna 40*f* may be copper or aluminum. The specific antenna structure of the metal antenna 40*f* is not limited here. Designers can make reasonable designs according to actual needs, as long as the metal antenna 40*f*** can achieve the transmission and reception of audio signals.

Figure 3:
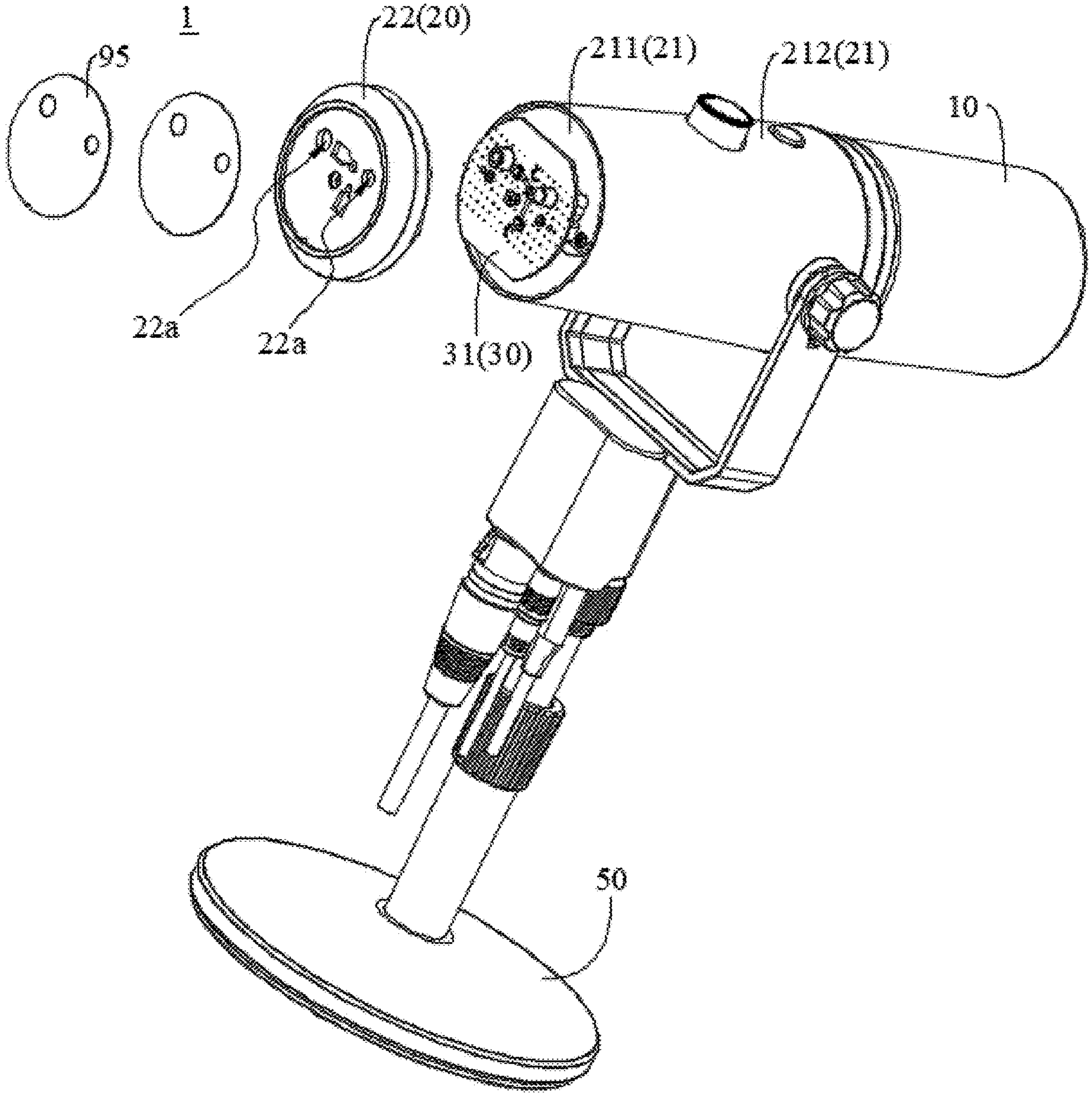
FIG. 3 is a partially exploded view of the desktop microphone of FIG. 1.
Figure 4:
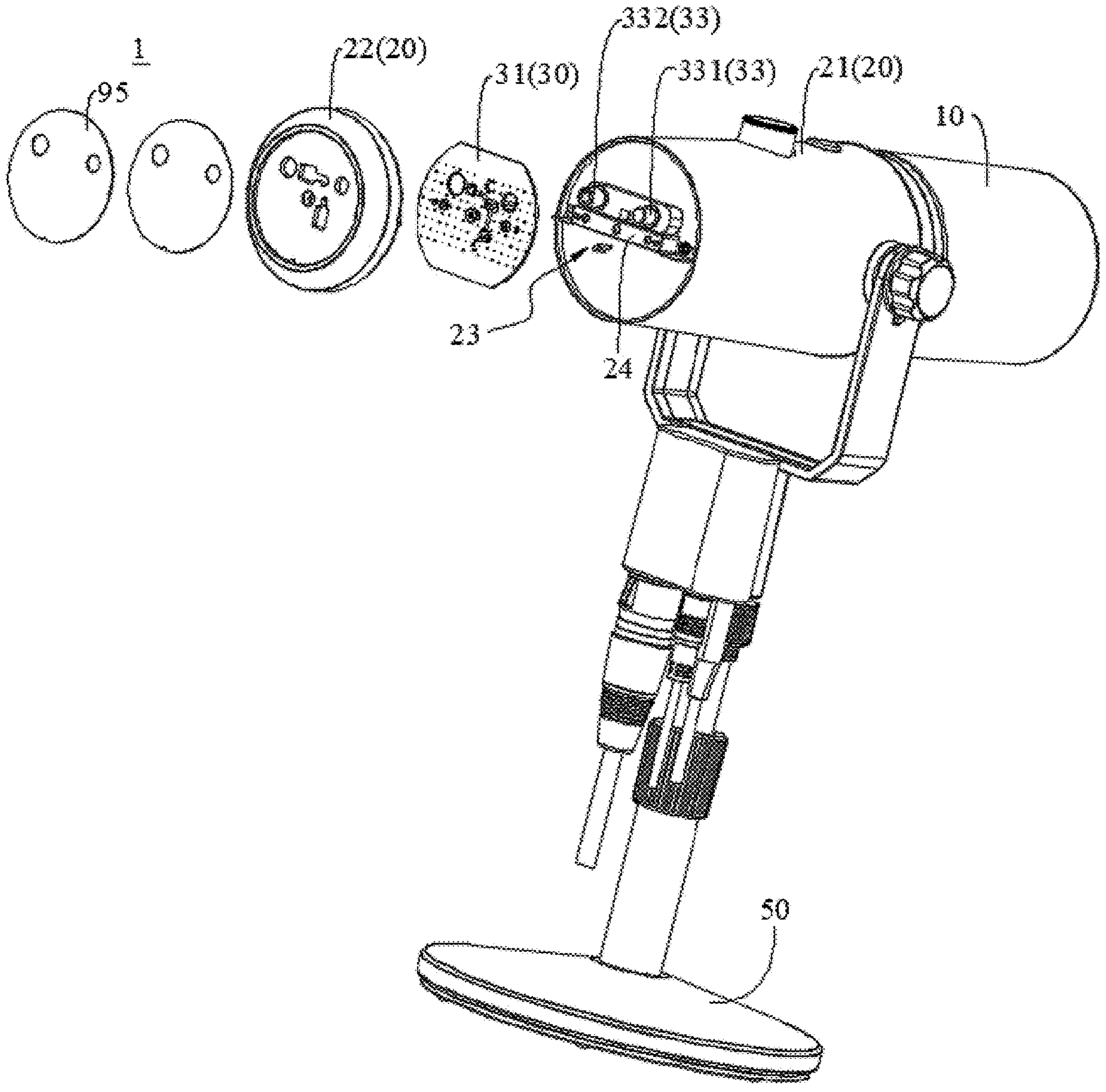
FIG. 4 is a further exploded view of FIG. 3.

As shown in FIGS. 3 and 4, the desktop microphone 1 also includes a flexible gasket 95, which is set on the side of the cover 22 facing away from the housing 21. Among them, the flexible pad 95 can be, but is not limited to, a flexible silicone pad or a flexible rubber pad. By designing a flexible gasket 95 on the end side where the cover 22 is located, it adds comfort to the user's operation on the first function switch 33 (described below) of the control component 30.

As shown in FIGS. 4, 5, 8-9 and 12, an inner support is provided in the housing assembly 20, which first includes a projection 24 made of metal material, for example, the material of the projection 24 can include but is not limited to aluminum alloy, stainless steel, or zinc alloy.

At least a portion of the projection 24 is located within the first accommodating chamber 23 enclosed by the cover 22 and the shell 21, for example, the entire projection 24 can be located within the first accommodating chamber 23, or a portion of the projection 24 can be located within the first accommodating chamber 23, while the remaining projection 24 is located within a second accommodating chamber **21*a* of the shell 21**.

The transmitting unit 41 and the receiving unit 42 are located on both sides of the convex platform 24. From the combination of FIGS. 7-9, it can be seen that the projection 24 is located in the middle position of the first circuit board 31, while the transmitting unit 41 and the receiving unit 42 are respectively arranged on both sides of the first circuit board 31. By designing the projection 24 made of metal material and placing the transmitting unit 41 and the receiving unit 42 on both sides of the projection 24, the projection 24 made of metal material can act as a shielding plate, which can further improve the isolation between the transmitting unit 41 and the receiving unit 42 to ensure that the audio signals between them do not interfere with each other.

The projection 24 is in the shape of a long strip, and the transmitting unit 41 and the receiving unit 42 are arranged on both sides of the projection 24 along the extension direction of the projection 24.

As shown in FIGS. 1-8, the wireless assembly 40 includes a first conductive circuit **40*a* integrated in the first circuit board 31, the first conductive circuit 40*a* is suitable as a transmitting unit 41 for wireless communication with external devices to send audio signals from the desktop microphone 1 to external devices. Alternatively, the first conductive circuit 40*a* is suitable as a receiving unit 42 for wireless communication with external devices to receive audio signals from external devices. It can be understood that the first conductive circuit 40*a* integrated in the first circuit board 31 forms a PCB antenna, and the antenna with the required operating frequency, bandwidth, and performance is designed by making copper traces of specific shapes and lengths on the first circuit board 31** (such as FR-4). Among them, external devices can include but are not limited to computers, mobile phones, or other wireless microphones.

For example, when the external device is a computer, the desktop microphone 1 also includes a wireless communicator, which is used to connect with the computer. When the first conductive circuit **40*a* is suitable for serving as the transmitting unit 41, it is wirelessly connected to the computer through a wireless communicator, transmitting the audio signal of the desktop microphone 1 to the wireless communicator through wireless transmission. The wireless communicator then sends the audio signal of the desktop microphone 1 to the computer. Alternatively, when the first conductive circuit 40*a* is suitable for serving as the receiving unit 42, the first conductive circuit 40*a* as the receiving unit 42 is wirelessly connected to a computer through a wireless communicator. The computer sends audio signals to the wireless communicator, which then wirelessly transmits the audio signals from the computer to the first conductive circuit 40*a* as the receiving unit 42**.

For another example, when the external device is another wireless microphone, the desktop microphone 1 does not include the wireless communicator mentioned above. When the first conductive circuit **40*a* is suitable for serving as the transmitting unit 41, it is directly wirelessly connected to the wireless receiving modules of the another wireless microphones to transmit the audio signal of the desktop microphone 1 to the wireless receiving modules of other wireless microphones through wireless transmission. Alternatively, when the first conductive circuit 40 is suitable for serving as the receiving unit 42, the first conductive circuit 40 as the receiving unit 42** is directly wirelessly connected to the wireless transmission module of another wireless microphones to receive audio signals from other wireless microphones through wireless transmission.

By designing the wireless assembly 40 to include a first conductive circuit **40*a* integrated into the first circuit board 31, which serves as a transmitting unit 41 or a receiving unit 42 for transmitting and receiving audio signals, the first conductive circuit 40*a* integrated in the first circuit board 31** forms the PCB antenna can effectively reduce manufacturing and assembly costs.

The wireless assembly 40 also includes a second conductive circuit **40*b* integrated in the first circuit board 31. The first conductive circuit 40*a* serves as the transmitting unit 41, and the second conductive circuit 40*b* serves as the receiving unit 42, and the first conductive circuit 40*a* and the second conductive circuit 40*b* are spaced apart. By setting a distance between the first conductive circuit 40*a* as the transmitting unit 41 and the second conductive circuit 40*b* as the receiving unit 42, the first conductive circuit 40*a* as the transmitting unit 41 and the second conductive circuit 40*b* as the receiving unit 42 are physically isolated, which can effectively reduce the mutual interference of audio signals between the first conductive circuit 40*a* as the transmitting unit 41 and the second conductive circuit 40*b* as the receiving unit 42. It should be noted that by designing independent first conductive circuit 40*a* as the transmitting unit 41 and second conductive circuit 40*b* as the receiving unit 42, the first conductive circuit 40*a* as the transmitting unit 41 are specifically used to transmit audio signals from the desktop microphone 1 to external devices, which can reduce the bandwidth of the first conductive circuit 40*a* as the transmitting unit 41 and improve the effective transmission power of the first conductive circuit 40*a* as the transmitting unit 41. The second conductive circuit 40*b* as the receiving unit 42 are specifically used to receive audio signals from external devices, which can reduce the bandwidth of the second conductive circuit 40*b* as the receiving unit 42 and improve the receiving sensitivity of the second conductive circuit 40***b* as the receiving unit 42.

Desktop microphone 1 defines a center line O-O', and the first circuit board 31 has a surface perpendicular to the center line O-O' of desktop microphone 1, and the surface has two opposing side edges 31*d*. The first conductive circuit 40*a* is located adjacent to one of the side edges 31*d*, the second conductive circuit 40*c* is located adjacent to the other side edge 31*d*, and the first conductive circuit 40*a* and the second conductive circuit 40*c* extend in opposite directions along the corresponding side edges 31*d*. This design ensures that the first conductive circuit 40*a* which serves as the transmitting unit 41, and the second conductive circuit 40*c* which serves as the receiving unit 42, are spaced apart as far as possible in physical space, achieving good isolation. In particular, the first conductive circuit 40*a* and the second conductive circuit 40*c* extend in straight lines at the side edge 31*d* respectively, similar to straight antenna, thus can be better used for transmitting and receiving signals.

The first conductive circuit 40*a*, which serves as the transmitting unit 41, and the second conductive circuit 40*c*, which serves as the receiving unit 42, are located on both sides of the projection 24. From the combination of FIGS. 7-9, it can be seen that the projection 24 is located in the middle position of the first circuit board 31, while the first conductive circuit 40*a* as the transmitting unit 41, and the second conductive circuit 40*c* as the receiving unit 42 are respectively arranged on both sides of the first circuit board 31. By designing the projection 24 of metal material, and placing the first conductive circuit 40*a* as the transmitting unit 41 and the second conductive circuit 40*b* as the receiving unit 42 on both sides of the projection 24 of metal material, the projection 24 made of metal material acts as a shielding plate, which can further improve the isolation between the first conductive circuit 40*a* as the transmitting unit 41 and the second conductive circuit 40*b* as the receiving unit 42, ensuring that the audio signals between the first conductive circuit 40*a* as the transmitting unit 41 and the second conductive circuit 40*b* as the receiving unit 42 do not interfere with each other.

The projection 24 is in the shape of a long strip, and the first conductive circuit 40*a* serving as the transmitting unit 41, and the second conductive circuit 40*b* serving as the receiving unit 42 are distributed on both sides of the projection 24 along the extension direction of the projection 24.

As shown in FIGS. 1-9, the first circuit board 31 is connected to one side of the projection 24 facing the cover 22. The specific connection relationship between the first circuit board 31 and the projection 24 is not limited here, and designers can make reasonable designs according to actual needs; for example, the first circuit board 31 can be, but is not limited to, detachably connected to the projection 24 through at least one of screw connection, card connection, or plug connection; for another example, the first circuit board 31 can also, but is not limited to, be non-removably connected to the projection 24 through adhesive bonding or riveting.

By designing the projection 24, and connecting the first circuit board 31 to the side of the projection 24 facing the cover 22, the projection 24 provides effective support for the first circuit board 31 while keeping it as far away from the shell 21 made of metal as possible. This allows sufficient clearance area for the wireless assembly 40 designed on the first circuit board 31, ensuring good signal transmission performance of the desktop microphone 1.

Figure 5:
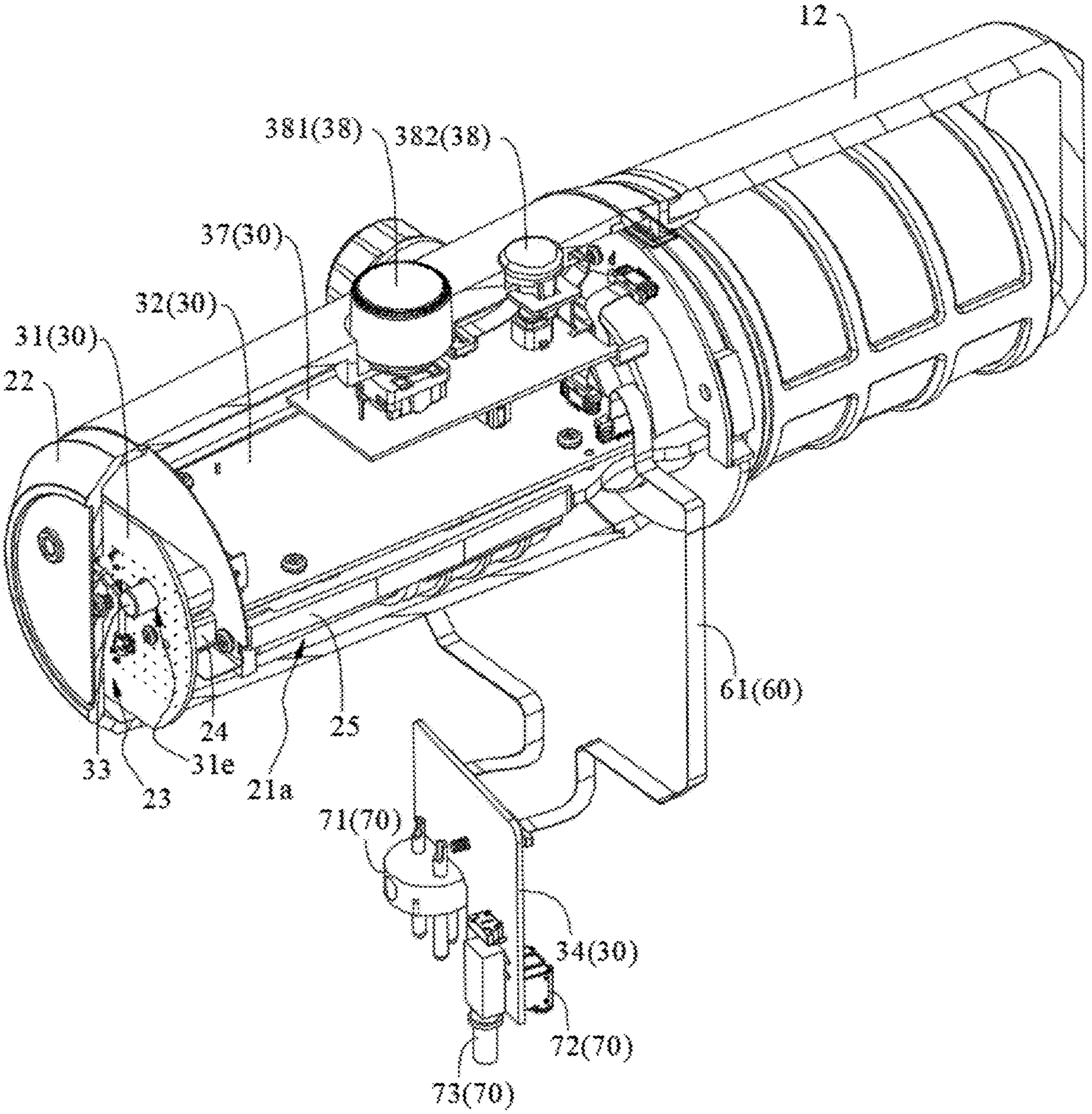
FIG. 5 is a partially cross-sectional view of the desktop microphone of FIG. 1.
Figure 6:
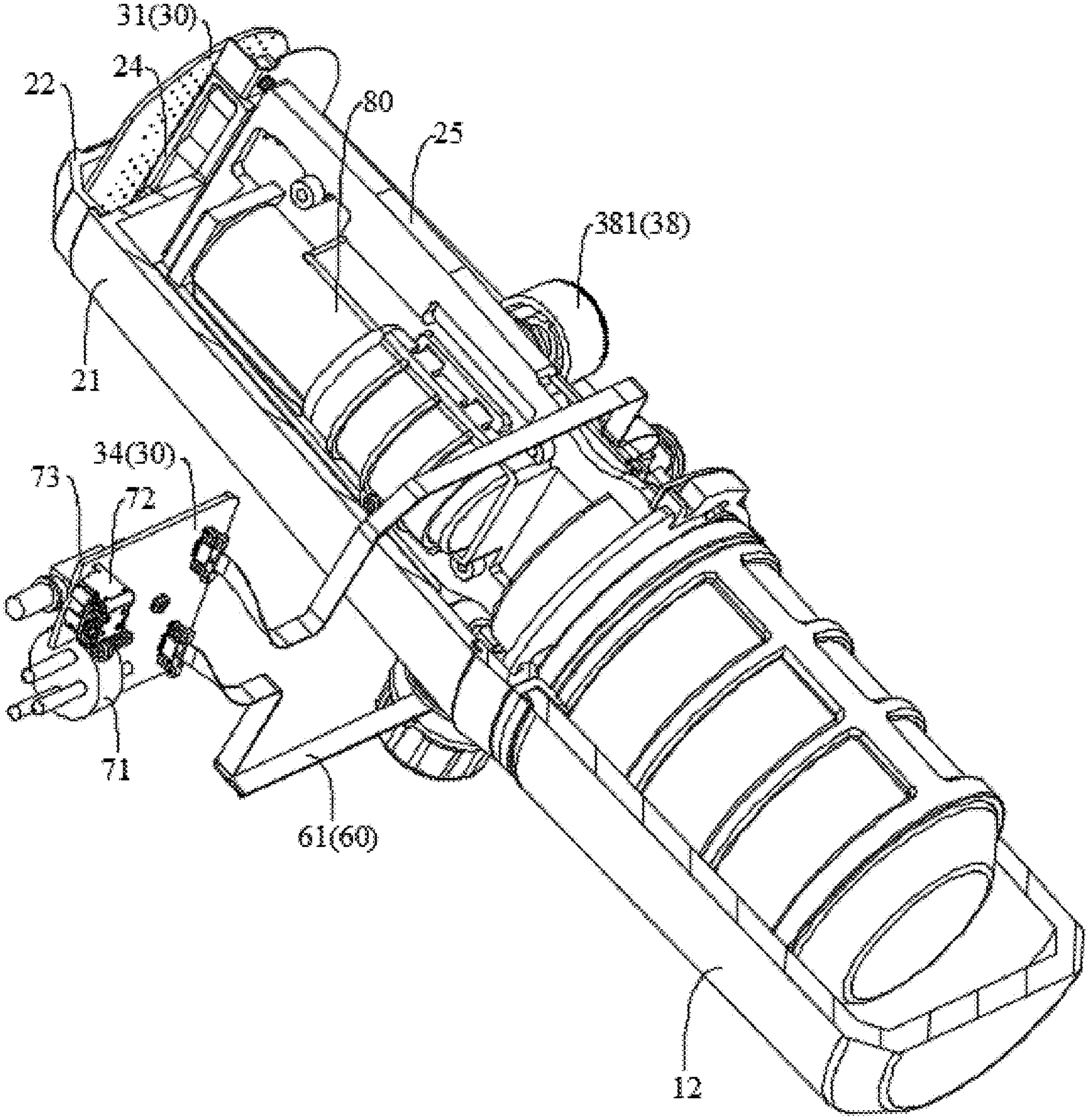
FIG. 6 is another view of the desktop microphone of FIG. 5.
Figure 7:
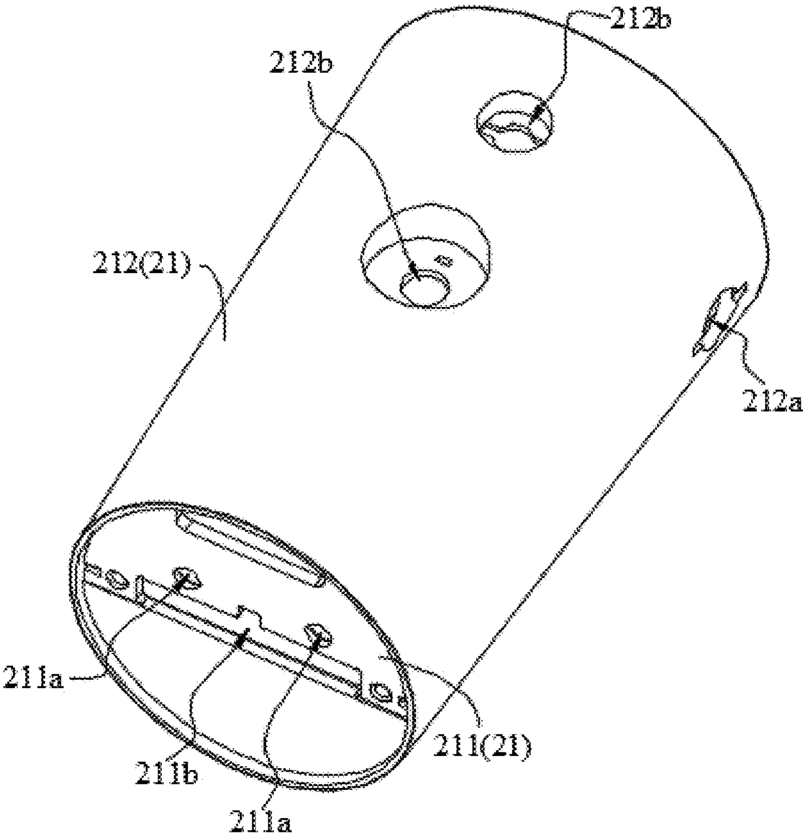
FIG. 7 is a schematic view of the shell of the desktop microphone of FIG. 1.
Figure 8:
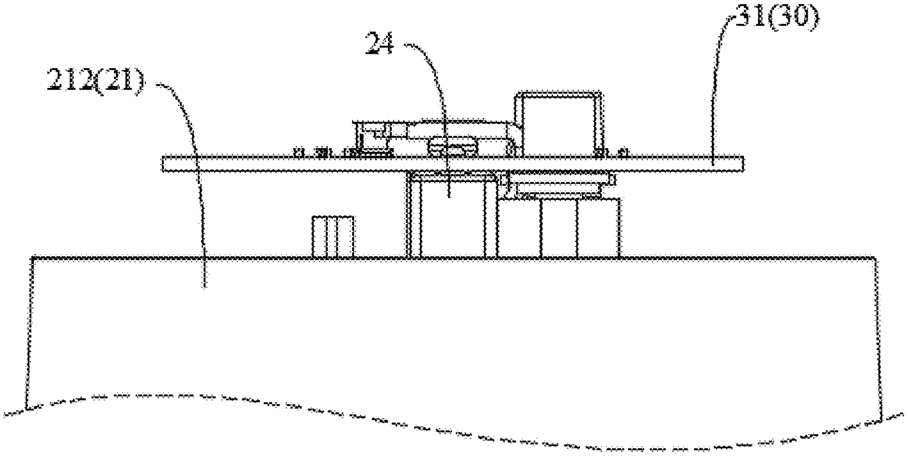
FIG. 8 is a partially cross-sectional view showing *nexus* of the protrusion and the first circuit board.

As shown in FIGS. 5, 7, and 9, the first circuit board 31 is provided with a fifth through hole 31*b*, and the projection 24 is provided with a second mounting hole 24*b* corresponding to the fifth through hole 31*b*. The desktop microphone 1 also includes a second fixing member 94, which is connected to the second mounting hole 24*b* through the fifth through hole 31*b* to position the first circuit board 31 on the projection 24.

Among them, the second mounting hole 24*b* is the part on the projection 24 used to cooperate with the second fixing member 94 to achieve relative fixation between the first circuit board 31 and the projection 24; the second fixing member 94 is an element that cooperates with the second mounting hole 24*b* to achieve relative fixation of the position between the first circuit board 31 and the projection 24. The specific manifestation of the second fixing member 94 that matches the second mounting hole 24*b* varies depending on the specific manifestation; for example, when the second mounting hole 24*b* is the second threaded hole 24*b*1, and the second fixing member 94 includes a second screw 941, which is threaded through the fifth through hole 31*b* and connected to the second threaded hole 24*b*1, the first circuit board 31 and the projection 24 are relatively fixed in position between them by locking the screw; for example, when the second mounting hole 24*b* is a second clamping hole (not shown in the figure), the second fixing member 94 includes a second clamping pin (not shown in the figure), and the second clamping pin is inserted through the fifth through hole 31*b* and connected to the second clamping hole by clamping, at this time, the first circuit board 31 and the projection 24 are relatively fixed in position between them through the clamping manner.

As shown in FIGS. 5, 7, and 9, the side of the projection 24 facing the bottom of the cover 22 is provided with at least one of a positioning protrusion 24*c* and a positioning hole 31*c*. The first circuit board 31 is provided with at least the other of the positioning protrusion 24*c* and the positioning hole 31*c*, and the positioning protrusion 24*c* is inserted into the positioning hole 31*c*. By designing the positioning protrusion 24*c* and the positioning hole 31*c*, the positioning protrusion 24*c* can be first inserted into the positioning hole 31*c* to achieve pre-positioning between the first circuit board 31 and the projection 24, this facilitates alignment between the fifth through-hole 31*b* and the second mounting hole 24*c*, and connects the second fixing component 94 to the second mounting hole 24*c*.

As shown in FIGS. 5, 7-9, the projection 24 is in contact with one side of the first circuit board 31 facing away from the bottom of the cover 22; the cover 22 is provided with a third perforation 22*b* that communicates with the first accommodating chamber 23, the first circuit board 31 is provided with a fourth through hole 31*a* corresponding to the third perforation 22*b*, and the projection 24 is provided with a first mounting hole 24*a* corresponding to the fourth through hole 31*a*. The desktop microphone 1 also includes a first fixing member 93, which sequentially passes through the third perforation 22*b*, the fourth through hole 31*a*, and is connected to the first mounting hole 24*a* to position the cover 22 on the projection 24.

Among them, the first mounting hole 24*h* is the part on the projection 24 used to cooperate with the first fixing member 93 to achieve relative fixation between the cover 22 and the projection 24; the first fixing member 93 is a part that cooperates with the first mounting hole 24*a* to achieve relative fixation between the cover 22 and the projection 24. The specific manifestation of the first fixing member 93 that matches the first mounting hole 24*a* varies depending on its specific manifestation; for example, when the first mounting hole 24*a* is the first threaded hole 24*a*1, the first fixing member 93 includes a first screw 931, which is sequentially threaded through the third perforation 22*b*, the fourth through hole 31*a*, and connected to the first threaded hole 24*a*1, at this time, the cover 22 and the projection 24 are relatively fixed in position between them by locking the screws; for example, when the first mounting hole 24*a* is the first clamping hole (not shown in the figure), the first fixing member 93 includes a first clamping pin (not shown in the figure), which is pierced through a third perforation 22*b* and a fourth through hole 31*a* and connected to the first clamping hole by clamping, at this time, the cover 22 and the projection 24 are fixed in position relative to each other through the clamping manner.

It should be noted that FIG. 9 is a partial enlarged view of FIG. 5, with the purpose of enlarging it to clearly see the structures of the third perforation 22*b*, the fourth through hole 31*a*, the fifth through hole 31*b*, the first mounting hole 24*a*, the second mounting hole 24*b*, the first fixing part 93, the second fixing part 94, the positioning hole 31*c*, and the positioning protrusion 24*c*.

It can be understood that the first conductive circuit 40*a* as the transmitting unit 41 is only one specific manifestation of the transmitting unit 41, and the second conductive circuit 40*c* as the receiving unit 42 is only one specific manifestation of the receiving unit 42. The specific manifestations of transmitting unit 41 and receiving unit 42 can be the same or different. Other specific manifestations of transmitting unit 41 and receiving unit 42 can include, but are not limited to, the following situations.

In the first scenario, at least one of the transmitting unit 41 and the receiving unit 42 includes or directly is a ceramic dielectric antenna (not shown in the figure) mounted on the first circuit board 31. For example, it can be that only the transmitting unit 41 includes a ceramic dielectric antenna set on the first circuit board 31, or it can be that only the receiving unit 42 includes a ceramic dielectric antenna set on the first circuit board 31, or it can be that both the transmitting unit 41 and the receiving unit 42 are ceramic dielectric antennas set on the first circuit board 31. The raw materials for ceramic dielectric antennas are abundant, and there are no restrictions on the specific antenna structure of ceramic dielectric antennas. Designers can make reasonable designs according to actual needs, as long as the ceramic dielectric antenna can achieve the transmission and reception of audio signals.

In the second scenario, at least one of the transmitting unit 41 and the receiving unit 42 includes or directly is a metal antenna (not shown in the figure) mounted on the first circuit board 31. For example, it can be that only the transmitting unit 41 includes a metal antenna set on the first circuit board 31, or it can be that only the receiving unit 42 includes a metal antenna set on the first circuit board 31, or it can be that both the transmitting unit 41 and the receiving unit 42 are metal antennas set on the first circuit board 31. The material of the metal antenna can be copper or aluminum. The specific antenna structure of the metal antenna is not limited here. Designers can make reasonable designs according to actual needs, as long as the metal antenna can achieve the transmission and reception of audio signals.

As shown in FIGS. 3 and 4, the desktop microphone 1 also includes a flexible gasket 95, which is set on the side of the cover 22 facing away from the shell 21. Among them, the flexible gasket 95 can be, but is not limited to, a flexible silicone pad or a flexible rubber pad. By designing a flexible gasket 95 on the end side where the cover 22 is located, it adds comfort to the user's operation on the first function switch 33 (described below) of the control component 30.

It should be noted that the above-mentioned projection 24 and mounting bracket 25 can be designed in a separate manner. In this case, the projection 24 can be connected to the mounting bracket 25 through, but is not limited to, screwing, clamping, plugging, gluing, or riveting. The projection 24 and mounting bracket 25 can also be designed as a single unit, and the projection 24 can be integrated with the mounting bracket 25 through, but is not limited to, injection molding or 3D printing. In addition, the bottom wall 211 is also provided with an opening 211*b* for the projection 24 to pass through.

As shown in FIG. 5, the first circuit board 31 is provided with a through-hole 31*e* for the first function switch 33 (such as the power switch 331 and the recording switch 332 mentioned above) to pass through. The axis of the first through-hole 211*a*, the axis of the through-hole 31*e*, and the axis of the second through-hole 22*a* are collinear.

As shown in FIGS. 13-21, the desktop microphone 1 includes the support assembly 50, which includes a first bracket 51. The first bracket 51 includes a U-shaped bracket structure 511 and a port socket 512. The two first ends of the U-shaped bracket structure 511 which face upwards are rotatably connected to the shell 21 (specifically the surrounding wall 212 introduced earlier), and the port socket 512 is set at the second end of the U-shaped bracket structure 511. The port socket 512 has a third accommodating chamber 512*a*. The control component 30 includes the third circuit board 34, which is disposed in the third accommodating chamber 512*a* of the port socket 512.

The wired interface module 70 includes at least one of the XLR interface 71, type-C interface 72, and headphone interface 73 that are electrically connected to the third circuit board 34. Specifically, the wired interface module 70 includes a XLR interface 71, a type-C interface 72, and an earphone interface 73 that are electrically connected to the third circuit board 34. Among them, the XLR interface 71 (commonly known as Cannon plug) adopts a three core cable (hot end, cold end, grounding), which can effectively suppress electromagnetic interference (EMI) and radio frequency interference (RFI), suitable for long-distance transmission of high fidelity audio signals. By designing the headphone interface 73, users can plug the data cable of external headphones into the headphone interface 73 according to their actual needs, in order to monitor audio signals in real time with the help of external headphones.

The U-shaped bracket structure 511 is provided with a wire slot 511*a* that is connected to the third accommodating chamber 512*a* of the port socket 512. The desktop microphone 1 also includes an electrical connector 60, which is partially buried in the wire slot 511*a*. One end of the electrical connector 60 is electrically connected to the third circuit board 34, and the other end of the electrical connector 60 passes through the surrounding wall 212 of the shell 21 and is electrically connected to the control component 30 (specifically the second circuit board 32 mentioned above). Among them, the third circuit board 34 serves as an adapter board, which can be a rigid circuit board, a flexible circuit board, or a combination of a rigid circuit board and a flexible circuit board; it should be noted that when the third circuit board 34 is a flexible circuit board, the control component 30 may also include another reinforcing plate, which is set on one side of the flexible circuit board to provide support for the flexible circuit board. The specific connection method between the third circuit board 34 and the port socket 512 is not limited here, and designers can make reasonable designs according to actual needs; For example, the third circuit board 34 can be, but is not limited to, detachably connected to the port socket 512 through at least one of screw connection, card connection, or plug connection; For example, the third circuit board 34 can also, but is not limited to, be non removable connected to the port socket 512 through adhesive bonding or riveting.

Designing the wired interface module 70 on the port socket 512 of the first bracket 51, compared to directly designing the wired interface module 70 on the shell 21, during the rotation of the shell 21, the data cables connected to the wired interface module 70 will not rotate together with the shell 21, thus avoiding the disorderly distribution or entanglement of data cables. Considering that the electrical connector 60 serves as the intermediate electrical connection structure between the third circuit board 34 and the control component 30 (specifically the second circuit board 32 mentioned above), the wired interface module 70 is designed on the basis of the port socket 512 of the first bracket 51. In order to facilitate the user's rotation of the shell 21 to any angle, the electrical connector 60 can maintain good electrical contact between the wired interface module 70 and the control component 30, thereby ensuring effective signal transmission. The specific manifestations of the electrical connector 60 can include but are not limited to the following embodiments.

As shown in FIGS. 14, 15, and 19-21, in the first embodiment, the U-shaped bracket structure 511 includes a U-shaped bracket 5111, with two first ends of the U-shaped bracket 5111 each having a first perforation 5111*a*, and the shell 21 (specifically the surrounding wall 212 mentioned above) having two second perforations 212*a* corresponding to the two first perforations 5111*a*. The U-shaped bracket structure 511 further includes two locking bolts 5112 and two locking nuts 5113, with each locking bolt 5112 extending one of the second perforations 212*a* and a corresponding one of the first perforations 5111*a*, and each locking nut 5113 being connected to one of the locking bolts 5112. The locking bolt 5112 has threads, and each locking nut 5113 is configured to drive the corresponding locking bolt 5112 to move along the axis of the second perforation 212*a* by rotating, thereby locking or loosening the shell 21. The U-shaped bracket 5111 has the above-mentioned wire slot 511*a*; the electrical connector 60 includes a flexible circuit board 61 embedded in the wire slot 511*a*, and each locking bolt 5112 is provided with a wire hole 5112*a* that communicates with the interior of the shell 21 (i.e., the second accommodating chamber 11*a* introduced earlier) and the wire slot 511*a*. One end of the flexible circuit board 61 passes through the wire hole 5112*a* and is electrically connected to the control component 30 (specifically, the second circuit board 32 introduced earlier), and the other end of the flexible circuit board 61 extends into the third accommodating chamber 512*a* of the port socket 512 and is electrically connected to the third circuit board 34.

By designing the flexible circuit board 61, it has good bending resistance. Therefore, when the user rotates the shell 21 to any angle, the flexible circuit board 61 can undergo appropriate deformation to maintain good electrical contact between the wired interface module 70 and the second circuit board 32 of the control component 30 (at this time, the conductive circuit formed by the wired interface module 70, the third circuit board 34, the flexible circuit board 61, and the second circuit board 32 is always conductive), thereby ensuring effective signal transmission.

Specifically, the U-shaped bracket structure 511 also includes two elastic shims 5114, and the locking bolt 5112 has a T-shaped structure. Each locking bolt 5112 is equipped with an elastic shim 5114, and the elastic shim 5114 is located between the head of the corresponding locking bolt 5112 and the surrounding wall 212 of the shell 21. When the user needs to adjust the angle of the shell 21, the user rotates the locking nut 5113, which drives the locking bolt 5112 connected to it to move away from the locking nut 5113 along the axis of the second perforation 212*a*. The head of the locking bolt 5112 releases the elastic shim 5114, and the elastic shim 5114 returns to elastic deformation; at this time, the surrounding wall 212 of the shell 21 will not be affected by the elastic force of the elastic shim 5114, and the shell 21 is in an unlocked state, then the user can rotate the shell 21 to the appropriate angle according to actual needs. After the angle of the shell 21 is adjusted, the user rotates the locking nut 5113 in the opposite direction, the locking nut 5113 rotates to drive the locking bolt 5112 connected to it to move along the axis of the second perforation 212*a* towards the direction close to the locking nut 5113; the head of the locking bolt 5112 presses the elastic shim 5114, and the elastic shim 5114 undergoes elastic deformation under force; at this time, the surrounding wall 212 of the shell 21 will be subjected to the elastic force of the elastic shim 5114, and the shell 21 will be in a locked state, in this way, the positioning of the shell 21 after angle adjustment can be achieved.

Figure 14:
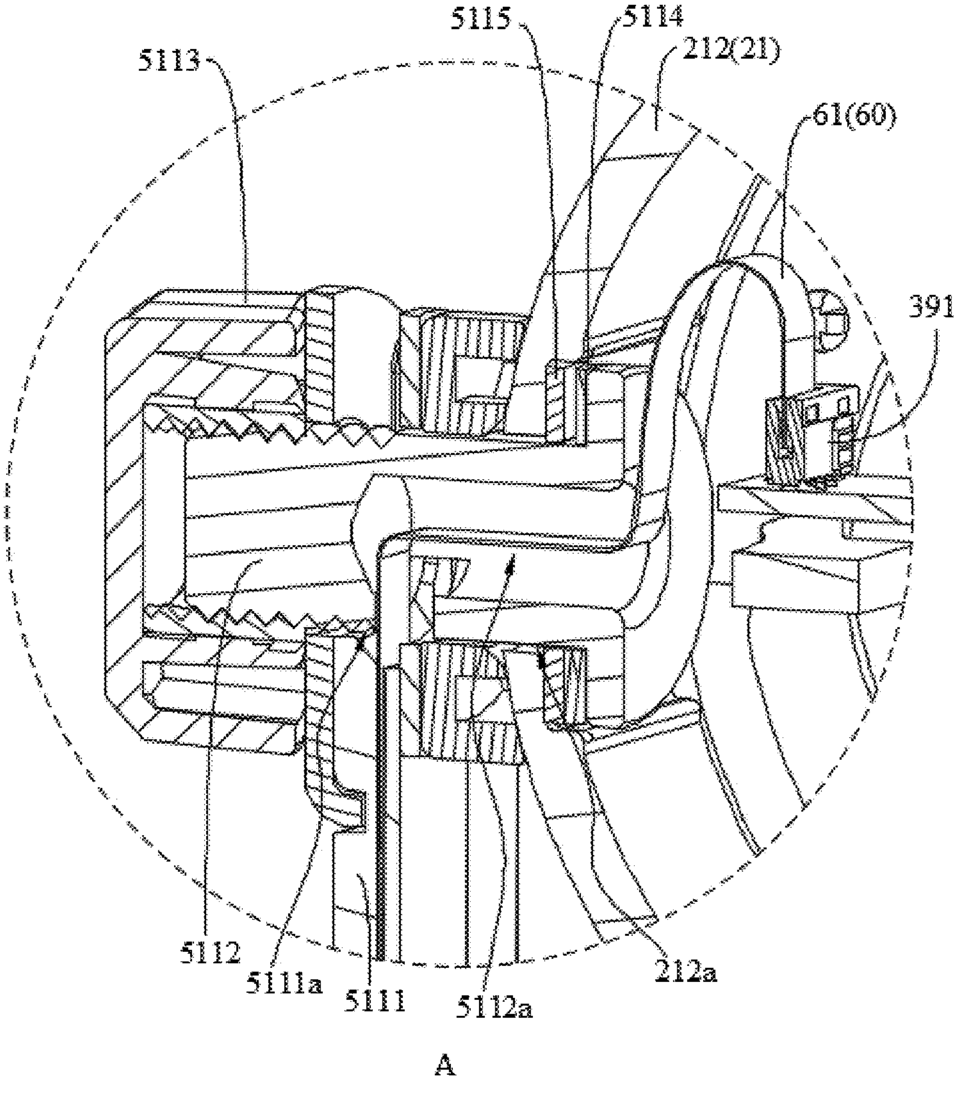
FIG. 14 is an enlarged view of the A part of FIG. 13.
Figure 15:
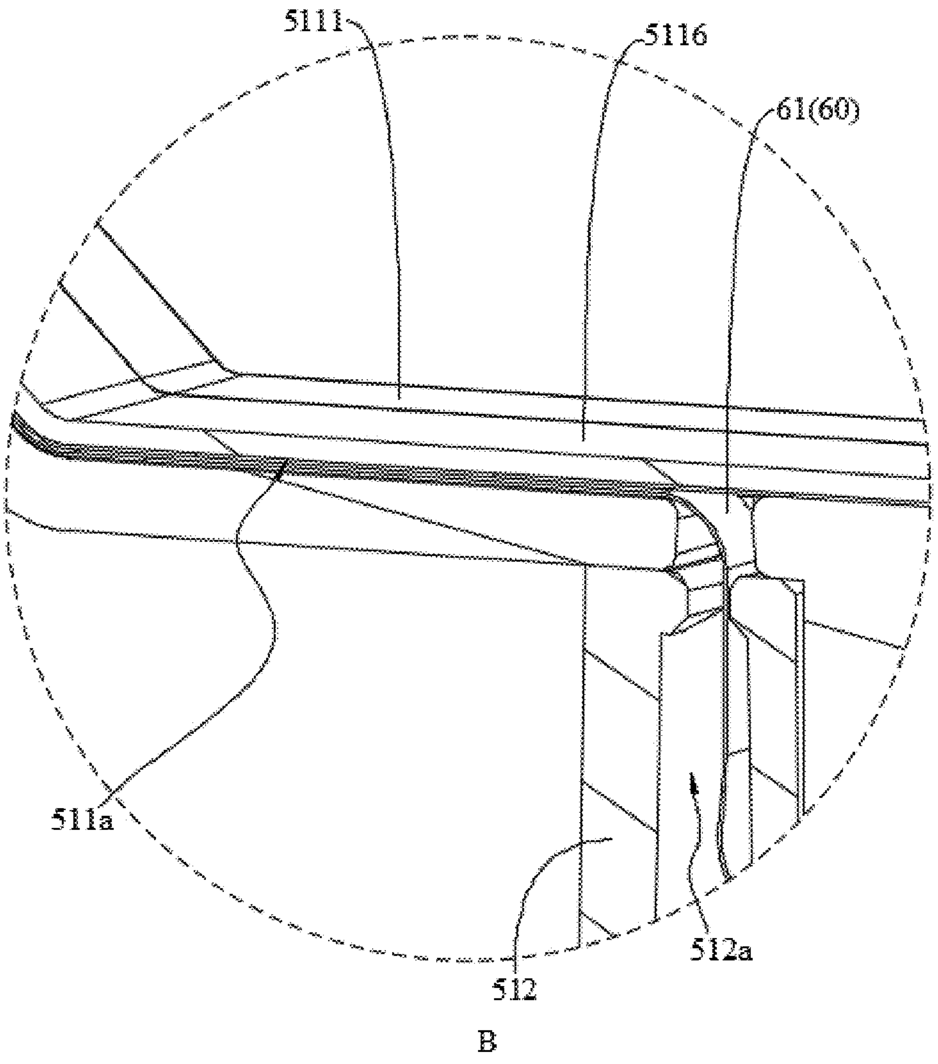
FIG. 15 is an enlarged view of the B part of FIG. 13.
Figure 16:
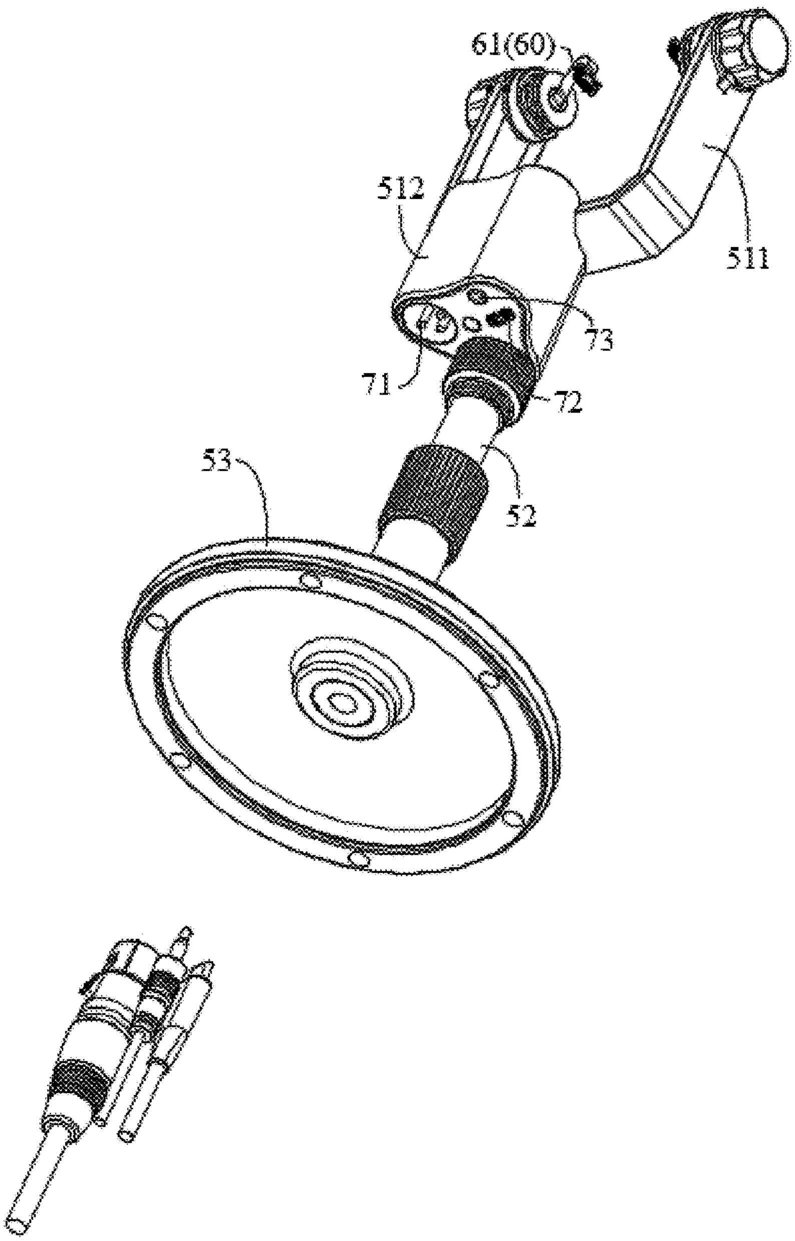
FIG. 16 is a schematic view of the support assembly of the desktop microphone FIG. 1.
Figure 17:
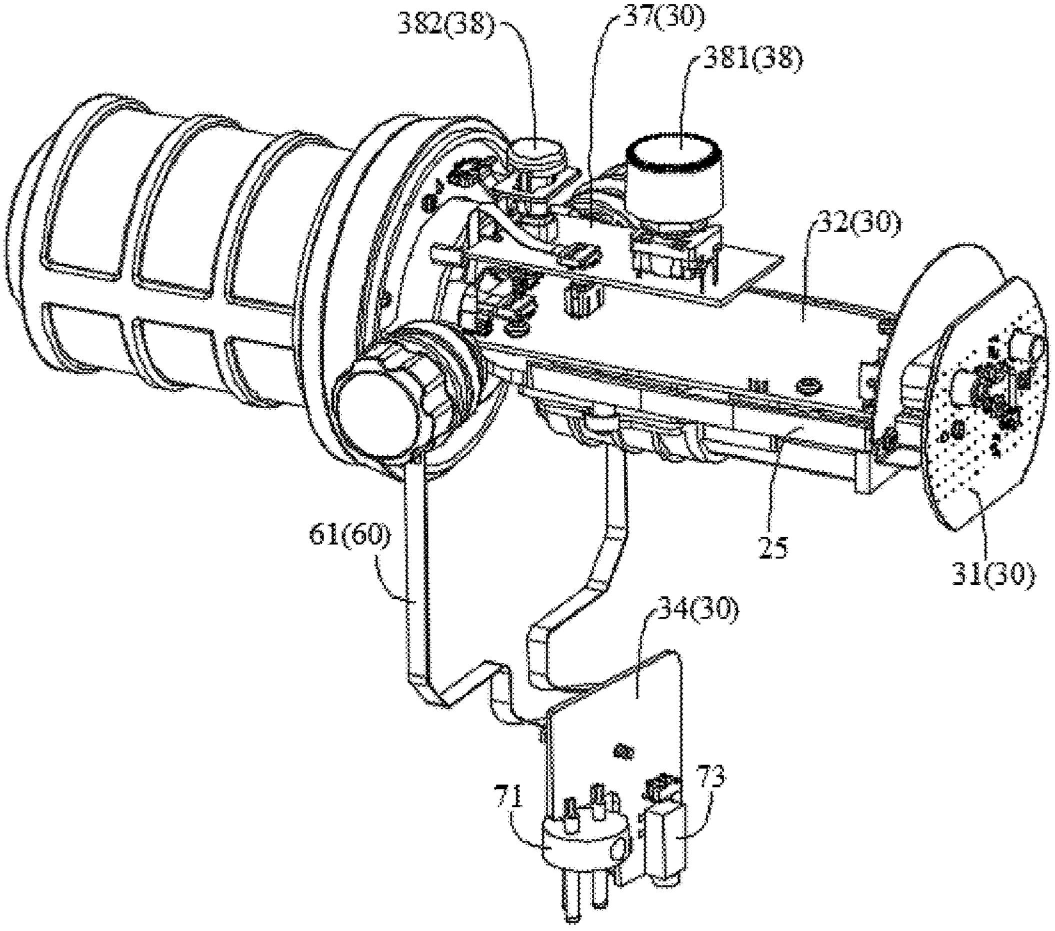
FIG. 17 shows an inner structure of the desktop microphone of FIG. 1.
Figure 18:
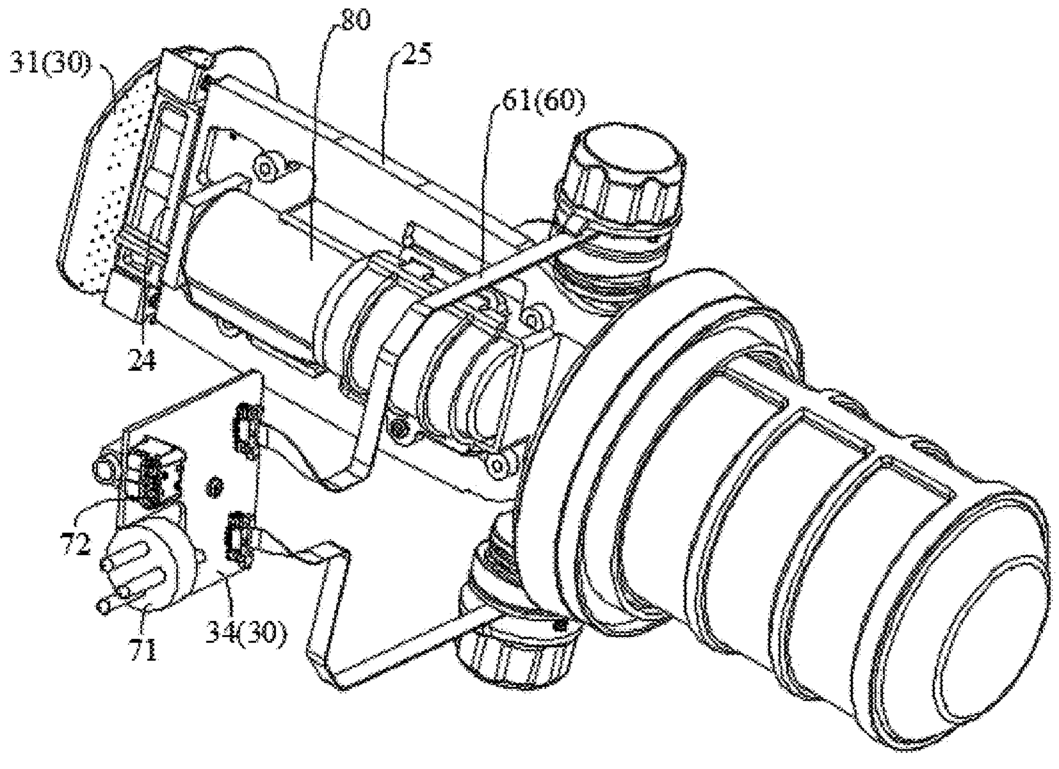
FIG. 18 is another view of FIG. 17.
Figure 19:
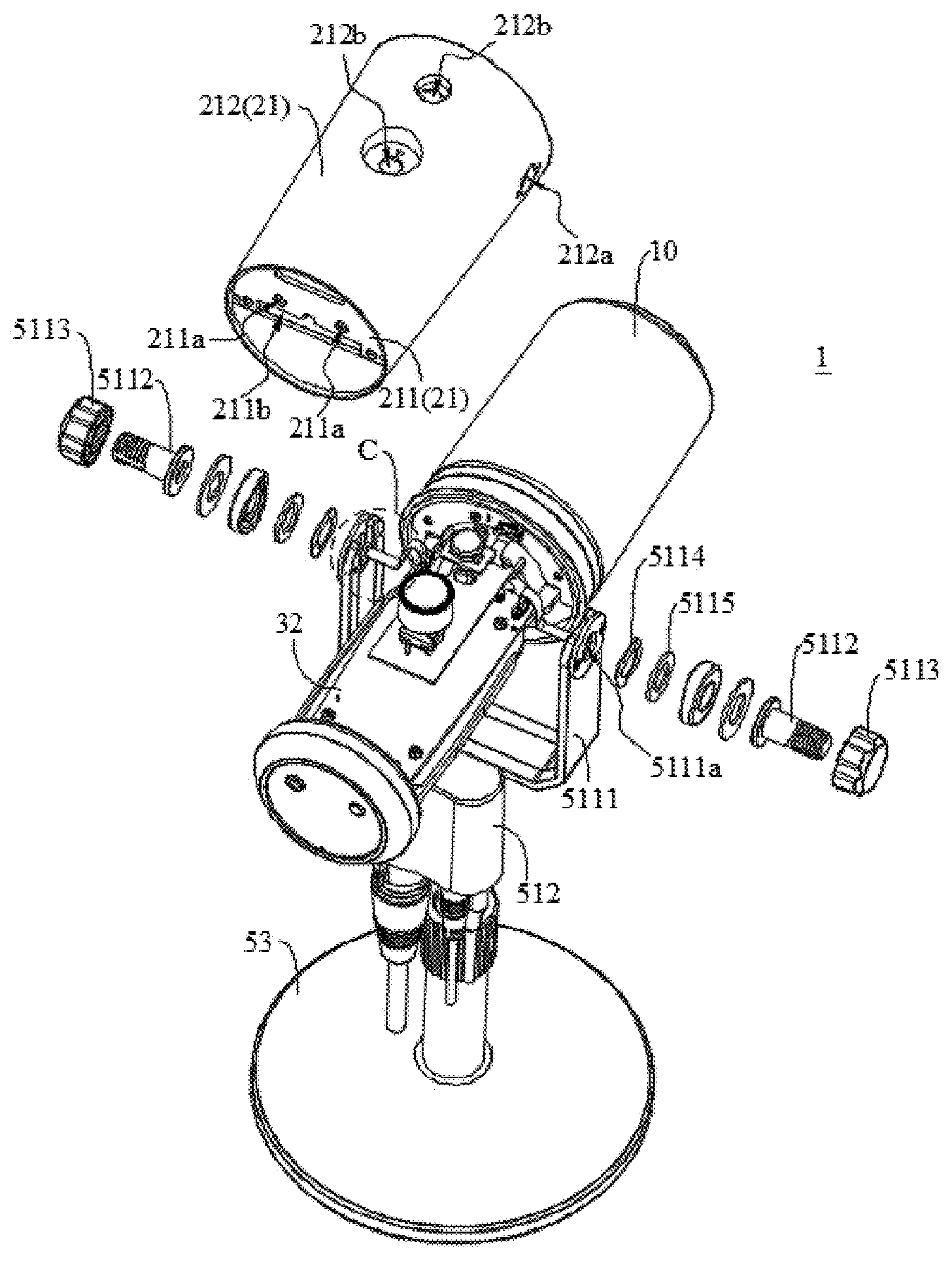
FIG. 19 is another partially exploded view of the desktop microphone FIG. 1.
Figure 20:
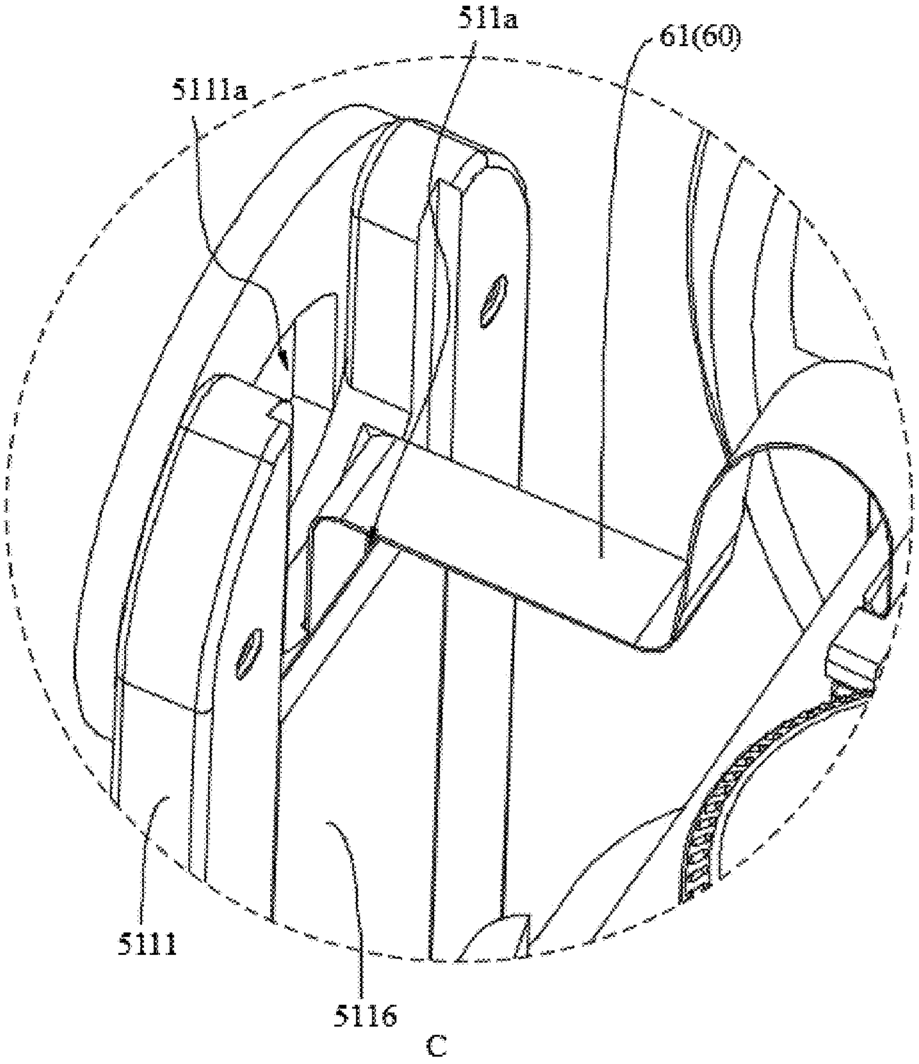
FIG. 20 is an enlarged view of the C part of FIG. 19.
Figure 21:
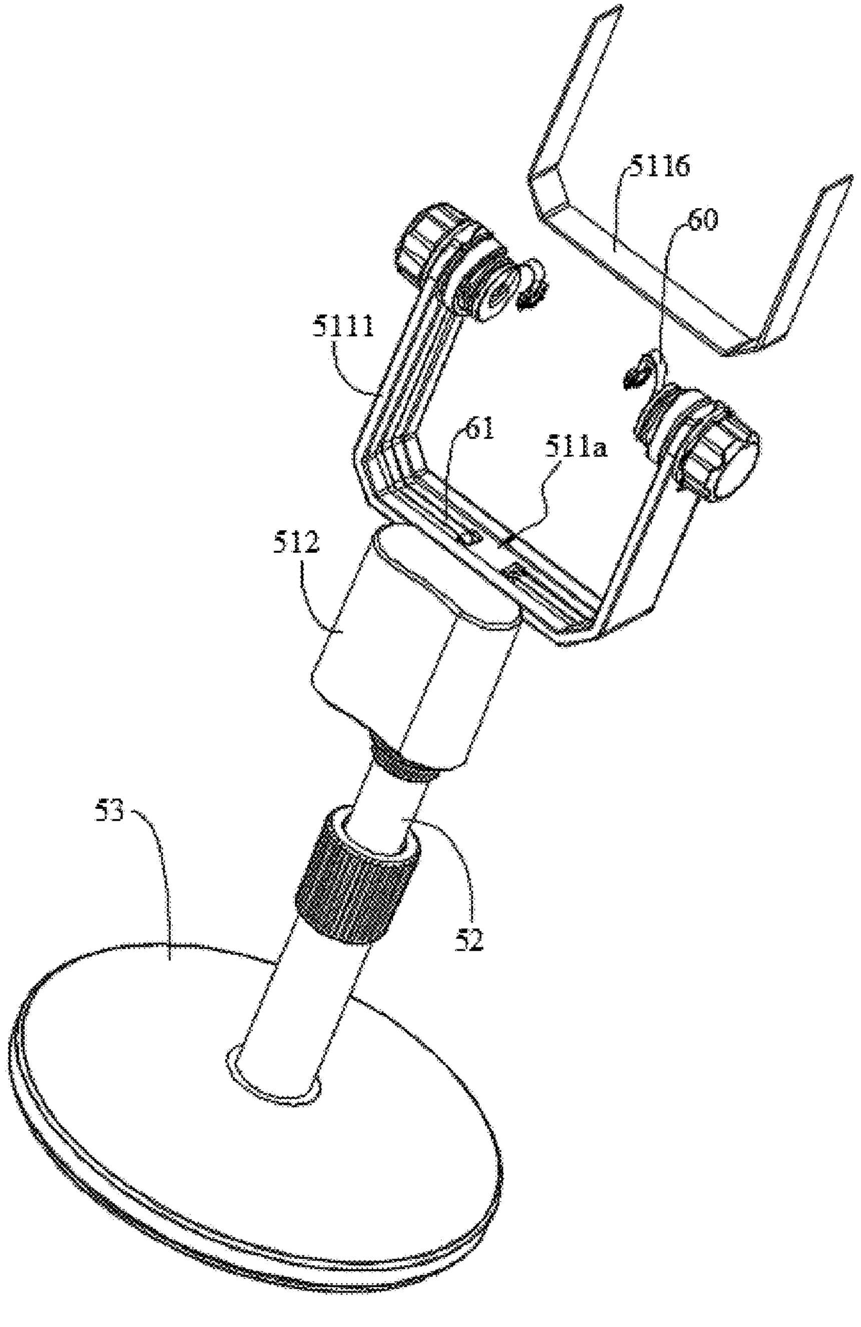
FIG. 21 is a partially exploded view of the support assembly of the desktop microphone FIG. 1.

The U-shaped bracket structure 511 also includes two buffer pads 5115, each locking bolt 5112 is equipped with a corresponding buffer pad 5115, and referring to FIG. 14, the buffer pad 5115 is located between the corresponding elastic shim 5114 and the surrounding wall 212 of the shell 21. Among them, the material of buffer pad 5115 can be, but is not limited to, elastic rubber, elastic silicone or sponge. By designing the buffer pad 5115, it has a buffering and protective effect, which can effectively avoid the problem of excessive elastic deformation caused by the elastic shim 5114 due to the rotation angle of the locking nut 5113 being too large, resulting in the elastic shim 5114 directly contacting the surrounding wall 212 of the shell 21 and causing deformation of the surrounding wall 212 of the shell 21.

The wire slot 511*a* is formed by concave inward from the surface of the U-shaped bracket 5111. The U-shaped bracket structure 511 also includes a covering plate 5116, which is connected to the U-shaped bracket 5111 to cover the wire slot 511*a*. Among them, the covering plate 5116 can be, but is not limited to, detachably connected to the U-shaped bracket 5111 through at least one of screw connection, clamping connection, or plug-in connection. By designing the groove 511*a* to be concave inward from the surface of the U-shaped bracket 5111, it facilitates the processing and forming of the groove 511*a* on the U-shaped bracket 5111, as well as the routing of the flexible circuit board 61; by designing the covering plate 5116, which is used to cover the slot of the wire slot 511*a*, the flexible circuit board 61 inside the wire slot 511*a* will not be directly exposed. On the one hand, it makes the entire desktop microphone 1 more aesthetically pleasing, and on the other hand, it provides good protection for the flexible circuit board 61.

It should be noted that the control component 30 also includes an electrical connection terminal 391 set on the second circuit board 32 and electrically connected to the second circuit board 32. The number of flexible circuit boards 61 is two, and the number of electrical connection terminal 391 is also two. The ends of the two flexible circuit boards 61 that are far away from the third circuit board 34 can be electrically connected to the second circuit board 32 through a closer electrical connection terminal 391, at this time, the redundant length of the two flexible circuit boards 61 in the second accommodating chamber 21*a* is relatively shorter. Of course, the ends of the two flexible circuit boards 61 that are far away from the third circuit board 34 can also be electrically connected to the second circuit board 32 through a farther electrical connection terminal 391, at this time, the redundant length of the two flexible circuit boards 61 in the second accommodating chamber 21*a* is relatively longer, in this way, when the shell 21 rotates, the torsional deformation generated by the two flexible circuit boards 61 will be smaller.

Figure 22:
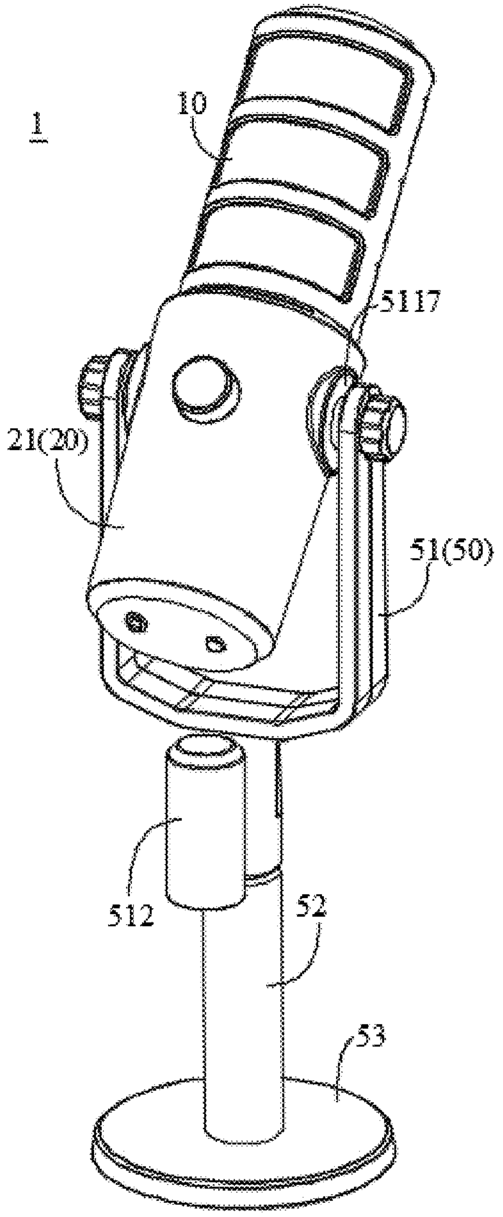
FIG. 22 is a schematic view of the of a desktop microphone according to an alternative embodiment of the present disclosure.
Figure 23:
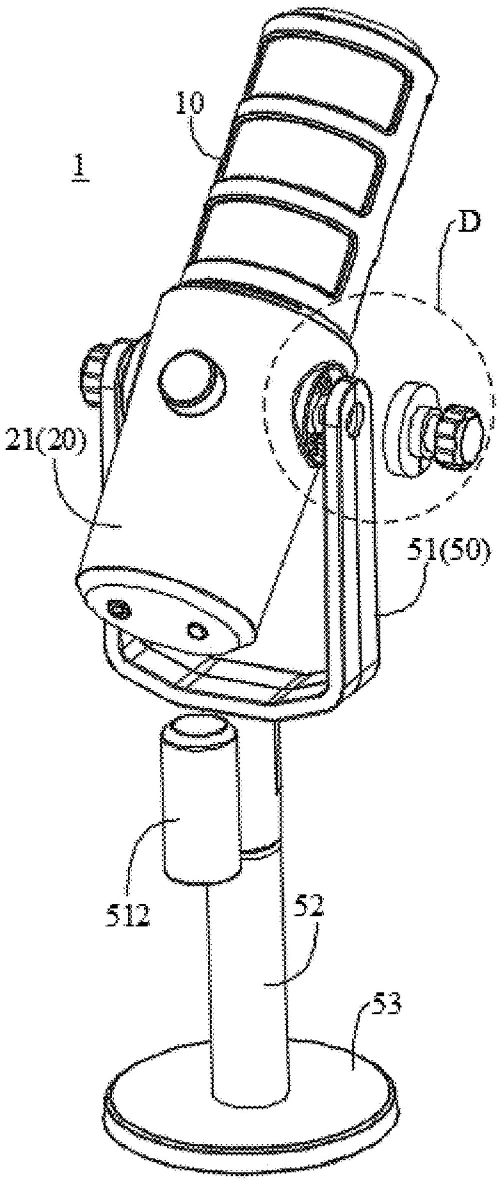
FIG. 23 is a partially exploded view of the desktop microphone of FIG. 22.
Figure 24:
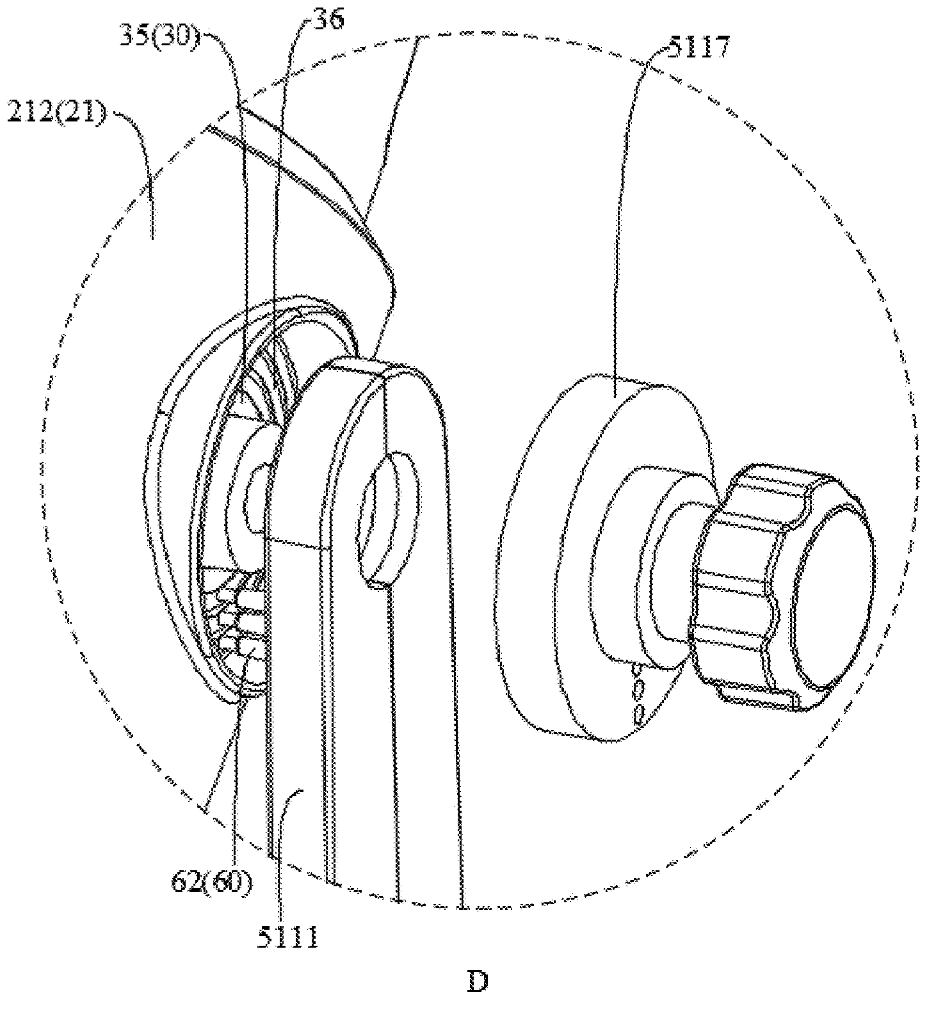
FIG. 24 is an enlarged view of the D part of FIG. 23.

As shown in FIGS. 22-24, in the second embodiment, the U-shaped bracket structure 511 includes a U-shaped bracket 5111 and two connecting parts 5117. The two first ends of the U-shaped bracket 5111 are respectively connected to the two connecting parts 5117, and the shell 21 (specifically the surrounding wall 212 introduced earlier) is rotatably connected to the two connecting parts 5117. The U-shaped bracket 5111 has the above-mentioned wire slot 511*a*. The control component 30 also includes a fourth circuit board 35 located inside the shell 21 (i.e., the second accommodating chamber 21*a* introduced earlier), and the surface of the fourth circuit board 35 is provided with a circular conductive plate 36. The fourth circuit board 35 is electrically connected to the above-mentioned second circuit board 32. The electrical connector 60 includes a conductive pin 62 and a wire 63. The conductive pin 62 passes through the connecting part 5117 and contacts the circular conductive plate 36. The wire 63 is buried in the wire slot 511*a*, and one end of the wire is electrically connected to the conductive pin 62. The other end of the wire 63 extends into the third accommodating chamber 512*a* of the port socket 512 and is electrically connected to the third circuit board 34.

Among them, the fourth circuit board 35 is located in the accommodating chamber 21*a* of the shell 21 and is electrically connected to the second circuit board 32 mentioned above. The fourth circuit board 35 can be, but is not limited to, detachably connected to the mounting bracket 25 through at least one of screw connection, clamping connection, or plug connection. The fourth circuit board 35 can also be, but is not limited to, non-detachably connected to the mounting bracket 25 mentioned above through adhesive bonding or riveting.

The surrounding wall 212 of the shell 21 is connected to the connecting part 5117 in a damping rotational manner, when the user needs to adjust the angle of the shell 21, the user directly applies a force to the shell 21 to allow the shell 21 to rotate relative to the connecting part 5117. After the shell 21 rotates to the appropriate angle, the user cancels the force acting on the shell 21, at this time, the shell 21 is stationary relative to the connecting part 5117, and the positioning of the shell 21 after angle adjustment can be achieved. It should be noted that the center line O-O' of the circular conductive plate 36 coincides with the rotation center of the shell 21, during the process of the shell 21 rotating relative to the connecting part 5117 under external force, the connecting part 5117 itself does not move, so the conductive pin 62 passing through the connecting part 5117 also remains stationary. The fourth circuit board 35 will rotate together with the shell 21, at this time, by designing the circular conductive plate 36 on the surface of the fourth circuit board 35, it can ensure that the circular conductive plate 36 is always in effective contact with the conductive pin 62, thereby maintaining good electrical contact between the wired interface module 70 and the second circuit board 32 of the control component 30 (at this time, the wired interface module 70, the third circuit board 34, the wire 63, and the conductive pin 62). The conductive circuit formed by the circular conductive plate 36, the fourth circuit board 35, and the second circuit board 32 is always conductive, ensuring effective signal transmission.

Figure 25:
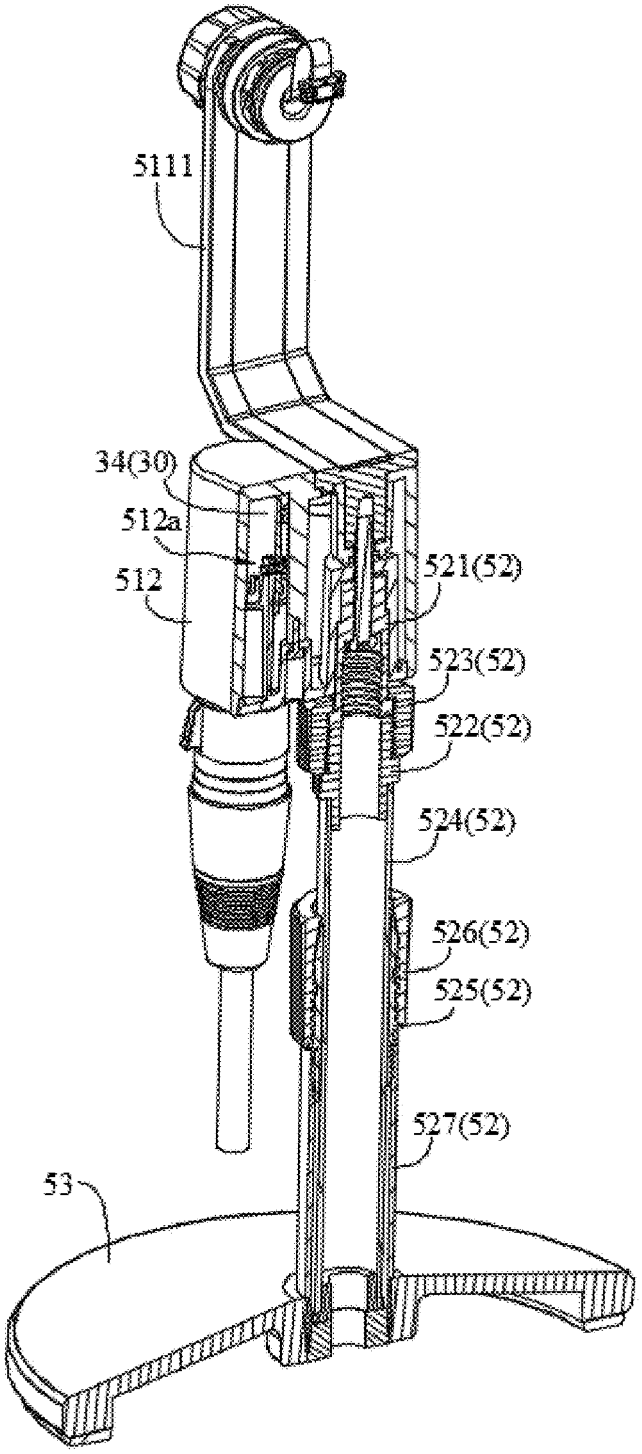
FIG. 25 is a cross-sectional view of the support assembly of the desktop microphone of FIG. 1.
Figure 26:
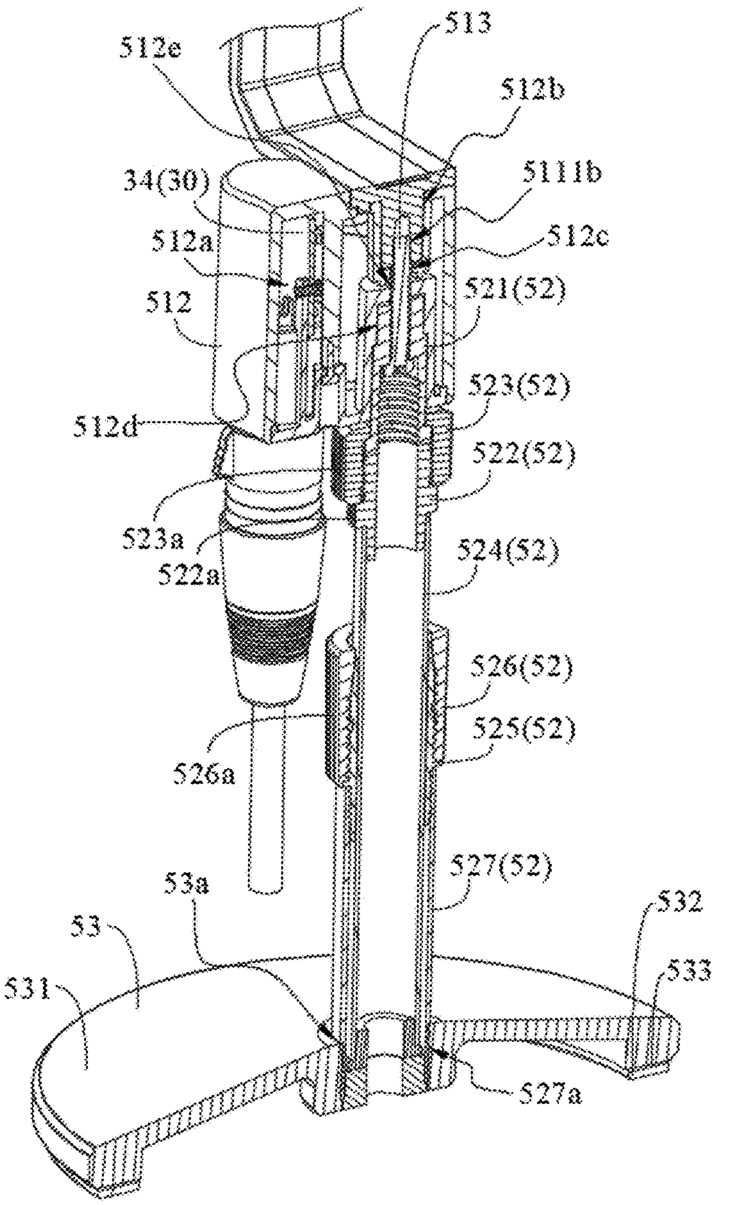
FIG. 26 is another partially exploded view of the desktop microphone of FIG. 1.

As shown in FIGS. 25-26, the support assembly 50 also includes a second bracket 52 and a base 53. The length of the second bracket 52 is adjustable and one end is fixedly connected to the first bracket 51. The base 53 is detachably connected to the end of the second bracket 52 away from the first bracket 51.

Specifically, the second bracket 52 includes a first pipe section 521, a second pipe section 522, a third pipe section 523, a fourth pipe section 524, a fifth pipe section 525, a sixth pipe section 526, and a seventh pipe section 527. A portion of the first pipe section 521 extends into the port socket 512 and is detachably secured to the U-shaped bracket 5111 by locking screws. The second pipe section 522 is located at a side of the first pipe section 521 away from the port socket 512, the third pipe section 523 is looped around a periphery of the first pipe section 521 and the second pipe section 522, and the third pipe section 523 is threaded with the second pipe section 522. The fourth pipe section 524 is located at a side of the second pipe section 522 away from the first pipe section 521, and is fixedly connected with the second pipe section 522. The fifth pipe section 525 is looped around a periphery of the fourth pipe section 524 and is fixedly connected with the fourth pipe section 524. The sixth pipe section 526 is looped around a periphery of a first part of the fifth pipe section 525 and is threaded with the first part of the fifth pipe section 525. The pipe section 527 is set around a periphery of the fourth pipe section 524 and a second part of the fifth pipe section 525, and the seventh pipe section 527 is threaded with the second part of the fifth pipe section 525, and the seventh pipe section 527 is connected to the base 53. By rotating the third pipe section 523 and/or the sixth pipe section 526, a length of the second bracket 52 can be adjusted. Of course, in other embodiments, the second bracket 52 can also be designed as a simple multi-stage telescopic rod structure to achieve adjustable length of the second bracket 52, which will not be repeated here.

A top surface of the port socket 512 is provided with a first slot 512*b* for inserting the U-shaped frame 5111, and a bottom wall of the first slot 512*b* is provided with a first insertion hole 512*c* connected to the third accommodating chamber 512*a*; a bottom surface of the port socket 512 is provided with a second slot 512*d* for inserting the first pipe section 521, and a bottom wall of the second slot 512*d* is provided with a second insertion hole 512*e* connected to the third accommodating chamber 512*a*; the part of the U-shaped frame 5111 inserted into the first slot 512*b* is provided with a fourth threaded hole 5111*b*, and the first bracket 51 also includes a locking screw 513, at least part of the inner diameter of the first pipe section 521 is adapted to the radial size of the screw of the locking screw 513, and the locking screw 513 sequentially passes through the first pipe section 521, the second insertion hole 512*e*, and first insertion hole 512*c*, and connects them with the fourth threaded hole 5111*b* to connect the first pipe section 521, the port socket 512, and the U-shaped bracket 5111 as a whole.

An outer surface of the second pipe section 522 is provided with a first anti slip pattern 522*a*; and/or, the outer surface of the third pipe section 523 is provided with a second anti slip pattern 523*a*; and/or, the outer surface of the sixth pipe section 526 is provided with a third anti slip pattern 526*a*. By designing the first anti slip pattern 522*a* on the outer surface of the second pipe section 522, the first anti slip pattern 522*a* is used to increase the friction between the second pipe section 522 and the user's hand, so that the user can rotate the second pipe section 522 to adjust the length of the second bracket 52; by designing a second anti slip pattern 523*a* on the outer surface of the third pipe section 523, the second anti slip pattern 523*a* is used to increase the friction between the third pipe section 523 and the user's hand, so that the user can rotate the third pipe section 523 to adjust the length of the second bracket 52; By designing a third anti slip pattern 526*a* on the outer surface of the sixth pipe section 526, the third anti slip pattern 526*a* is used to increase the friction between the sixth pipe section 526 and the user's hand, so that the user can rotate the sixth pipe section 526 to adjust the length of the second bracket 52.

The seventh pipe section 527 is detachably connected to the base 53. A middle portion of the base 53 is provided with a third threaded hole 53*a*, and the outer surface of the seventh pipe section 527 near the base 53 is provided with an external thread 527*a* to be connected to the third threaded hole 53*a*. By designing the threaded connection between the seventh pipe section 527 and the base 53, it is easy to achieve assembly between the seventh pipe section 527 and the base 53.

The base 53 includes a base body 531 and an anti slip pad 532. The base body 531 is connected to one end of the second bracket 52 away from the first bracket 51, and the anti slip pad 532 is connected to the side of the base body 531 away from the second bracket 52. The base body 531 is used to provide support for the second bracket 52 and the first bracket 51, so that the entire desktop microphone 1 can be smoothly placed on the desktop through the base body 531; the design of the anti slip pad 532 is used to increase the friction between the base body 531 and the desktop, thereby enhancing the stability of the desktop microphone 1 placed on the desktop.

Other details regarding the design of anti slip pad 532 and base 53 can include, but are not limited to, the following situations.

In the first scenario, the anti slip pad 532 can be made of elastic materials such as rubber or silicone, but is not limited to them.

In the second scenario, the anti slip pad 532 is annular, which enhances the stability of the desktop microphone 1 when placed on the desktop while reducing the amount of anti slip pad 532 used and lowering costs.

In the third scenario, the base 53 also includes an adhesive layer 533, and the anti slip pad 532 is connected to the base body 531 through the adhesive layer 533, which facilitates the assembly between the anti slip pad 532 and the base body 531. Among them, the adhesive layer 533 can include, but is not limited to, a glue layer or a double-sided adhesive layer.

As shown in FIGS. 5 and 10, the surrounding wall 212 of the shell 21 is provided with a third through hole 212*b* that is connected to the second accommodating chamber 21*a*. The control component 30 also includes a fifth circuit board 37 and a second function switch 38 that is electrically connected to the fifth circuit board 37. The fifth circuit board 37 is installed on the mounting bracket 25 and is electrically connected to the second circuit board 32 mentioned above. The second function switch 38 is provided with a third through hole 212*b* to expose the outside of the second receiving chamber 21*a* of the shell 21.

Among them, the fifth circuit board 37 serves as an adapter board, which can be a rigid circuit board, a flexible circuit board, or a combination of a rigid circuit board and a flexible circuit board; It should be noted that when the fifth circuit board 37 is a flexible circuit board, the control component 30 may also include another reinforcement board, which is set on one side of the flexible circuit board to provide support for the flexible circuit board. The specific connection method between the fifth circuit board 37 and the mounting bracket 25 is not limited here, and designers can make reasonable designs according to actual needs; for example, the fifth circuit board 37 can be, but is not limited to, detachably connected to the mounting bracket 25 through at least one of screw connection, clamping connection, or plug connection; for another example, the fifth circuit board 37 can also be non-removably connected to the mounting bracket 25 through adhesive bonding or riveting, but not limited to.

The second function switch 38 is suitable for generating corresponding electrical signals under user operation, and the controller of the control component 30 controls the desktop microphone 1 to perform different functions according to different electrical signals. For example, the second function switch 38 includes a gain adjustment knob 381, which is electrically connected to the fifth circuit board 37. The gain adjustment knob 381 is used to generate a gain adjustment signal (one of the above electrical signals) under user operation, and the controller of the control component 30 adjusts the gain of the desktop microphone 1 based on the gain adjustment signal. For example, the second function switch 38 also includes a noise reduction switch 382, which is electrically connected to the fifth circuit board 37. The noise reduction switch 382 is used to generate a mute on/off signal (another type of electrical signal mentioned above) under the user's operation. The controller of the control component 30 controls the mute on/off function of the desktop microphone 1 based on the mute on/off signal.

As shown in FIG. 6, FIG. 11-14, the sound pickup assembly 10 includes a microphone head 11 for collecting audio signals, a windproof cover 12 placed around a periphery of the microphone head 11, and a support 13 made of a material that can undergo elastic deformation. The microphone head 11 is connected to the mounting frame 25 through the support 13. The sound pickup assembly 10 also includes a support ring 14 made of hard material, which is sleeved on the periphery of the support 13. Among them, the supporting ring 14 is usually made of hard materials such as plastic, aluminum alloy, titanium alloy, etc.

The desktop microphone 1 also includes a battery 80, which is installed on the mounting bracket 25 and electrically connected to the second circuit board 32. The battery 80 provides the power required for desktop microphone 1 to operate, ensuring high-quality audio signals and reliable wireless transmission with energy security.

Among them, the microphone head 11 is electrically connected to the second circuit board 32 of the control component 30. The support 13 serves as the intermediate connection structure between the microphone head 11 and the mounting frame 25. The support 13 is usually made of materials such as elastic rubber or elastic silicone that can undergo elastic deformation, in this way, the support 13 can effectively shock the microphone head 11. The specific connection method between the support 13 and the mounting bracket 25 is not limited here, and designers can make reasonable designs according to actual needs; for example, the support 13 can be, but is not limited to, detachably connected to the mounting bracket 25 through at least one of screw connection, clamping connection, or plug-in connection; for example, the support 13 can also be non-removably connected to the mounting bracket 25 through adhesive bonding or riveting, but not limited to. The support 13 can undergo elastic deformation. The support 13 is directly fitted with the microphone head 11 and achieves relative fixation with the microphone head 11 through interference fit.

The windproof cover 12 can disperse concentrated and rapid airflow into multiple slow and small eddies, greatly reducing the energy of the airflow reaching the diaphragm of microphone head 11, thereby preventing the diaphragm of microphone head 11 from producing violent unexpected vibrations and reducing wind noise and wheat spraying sound. The windproof cover 12 serves as a physical barrier that can prevent dust, fine sand, fingerprints, and slight moisture (such as saliva) from directly contacting the diaphragm of microphone head 11, extending the service life of desktop microphone 1.

Other technical effect of present application is that by designing the first function switch 33 on the end side of the cover 22 opposite to the sound pickup assembly 10, the bottom space of the desktop microphone 1 can be reasonably utilized to reserve sufficient installation space for the second function switch 38 of the control component 30 of the desktop microphone 1 on the surrounding wall 212 of the shell 21. In addition, the wired interface module 70 is installed on port socket 512 and electrically connected to the third circuit board 34, the wired interface module 70 serves as the wired interface end of the desktop microphone 1, and is connected to external devices through wired communication via a data cable. It should be noted that when desktop microphone 1 communicates with external devices through the wired interface module 70 via a data cable, the external device can also serve as a power source to charge the battery 80 of desktop microphone 1.

As shown in FIGS. 26-30, part of the mounting bracket 25 extends outside of the second accommodating chamber 21*a*, and the desktop microphone 1 includes a light emitting assembly 90, which includes a sixth circuit board 91 and multiple light emitting beads 92. The sixth circuit board 91 is mounted on the mounting bracket 25, and multiple light emitting beads 92 are arranged on the side of the sixth circuit board 91 facing away from the first circuit board 31 and electrically connected to the sixth circuit board 91. The multiple light emitting beads 92 are spaced around the centerline O-O' of the desktop microphone 1. The housing assembly 20 also includes a transparent member 26, which is located at one end of the shell 21 away from the cover 22, and covers the surface where the light emitting assembly 90 is located. The transparent member 26 has transparency, an outer surface of the transparent member 26 is exposed outside, and the light emitted by the lamp bead 92 can pass through the transparent member 26. The transparent member 26 is made of insulating non-metallic material. The control component 30 also includes a controller 30*a* and a detection unit 392. The detection unit 392 includes a capacitor 30*c*, a detection circuit 30*d*, and a conductive component 30*e*. The capacitor 30*c* is electrically connected to the sixth circuit board 91, and a first electrode of the capacitor contacts the transparent member 26 through the conductive component 30*e*, a second electrode of the capacitor 30*c* is electrically connected to the controller 30*a* through the detection circuit 30*d*; when the user's finger touches the outer surface of the transparent member 26, the capacitance value of the capacitor 30*c* can change, i.e., the outer surface can serve as a touching area to cause the detection circuit 30*d* to output a detection signal generated according to the change in capacitance value of the capacitor 30*c*; the controller 30*a* controls the light emitting beads 92 (may be LED) to light up in a preset way (such as constantly on, flashing, or presenting different colors) based on the received detection signal, and at the same time controls the desktop microphone 1 to perform corresponding functions (such as mute function).

Among them, the material of the transparent member 26 can be, but is not limited to, plastic, glass, or ceramic. The controller 30*a* is electrically connected to the second circuit board 32 mentioned above, and the detection circuit is integrated on the second circuit board 32. The sixth circuit board 91 is electrically connected to the second circuit board 32 through a flexible circuit board. The detection circuit may include an RC oscillator, which periodically sends a frequency signal f1 (belonging to one of the detection signals) to the controller. The calculation formula for the frequency signal f1 involves the capacitance value. When the user's finger touches the touching area of the transparent member 26, the change in capacitance value Cs1 of the capacitor is greater than 0, and the frequency decreases. When the user's finger touches the touch area of the transparent member 26 without being detected, the change in capacitance value Cs1 of the capacitor is equal to 0, and the frequency remains unchanged. The controller then judges the user based on whether the frequency value decreases. Whether the touch operation of fingers on the touch area occurs. Of course, the controller can also be electrically connected to the fourth circuit board 35 mentioned above, and the detection circuit is integrated on the fourth circuit board 35. The sixth circuit board 91 is electrically connected to the fourth circuit board 35 through a flexible circuit board.

The conductive component includes conductive foam 3922 and metal elastic body 3921. The conductive foam 3922 is electrically connected to the first electrode plate of the capacitor. One end of the metal elastic body 3921 is electrically connected to the conductive foam 3922, and the other end of the metal elastic body 3921 is in contact with the transparent member 26. The conductive foam 3922 and metal elastic body 3921 are used to connect the first electrode of the capacitor to the transparent member 26, so there is no need to design the first electrode of the capacitor to directly contact the inner surface of the transparent member 26, which facilitates the assembly of various components and ensures high sensitivity of the capacitor. The design of conductive foam 3922 is used to achieve electrical conductivity between the metal elastic body 3921 and the first electrode of the capacitor, and to make the distribution of light emitted by the lamp bead 92 more uniform.

Figure 27:
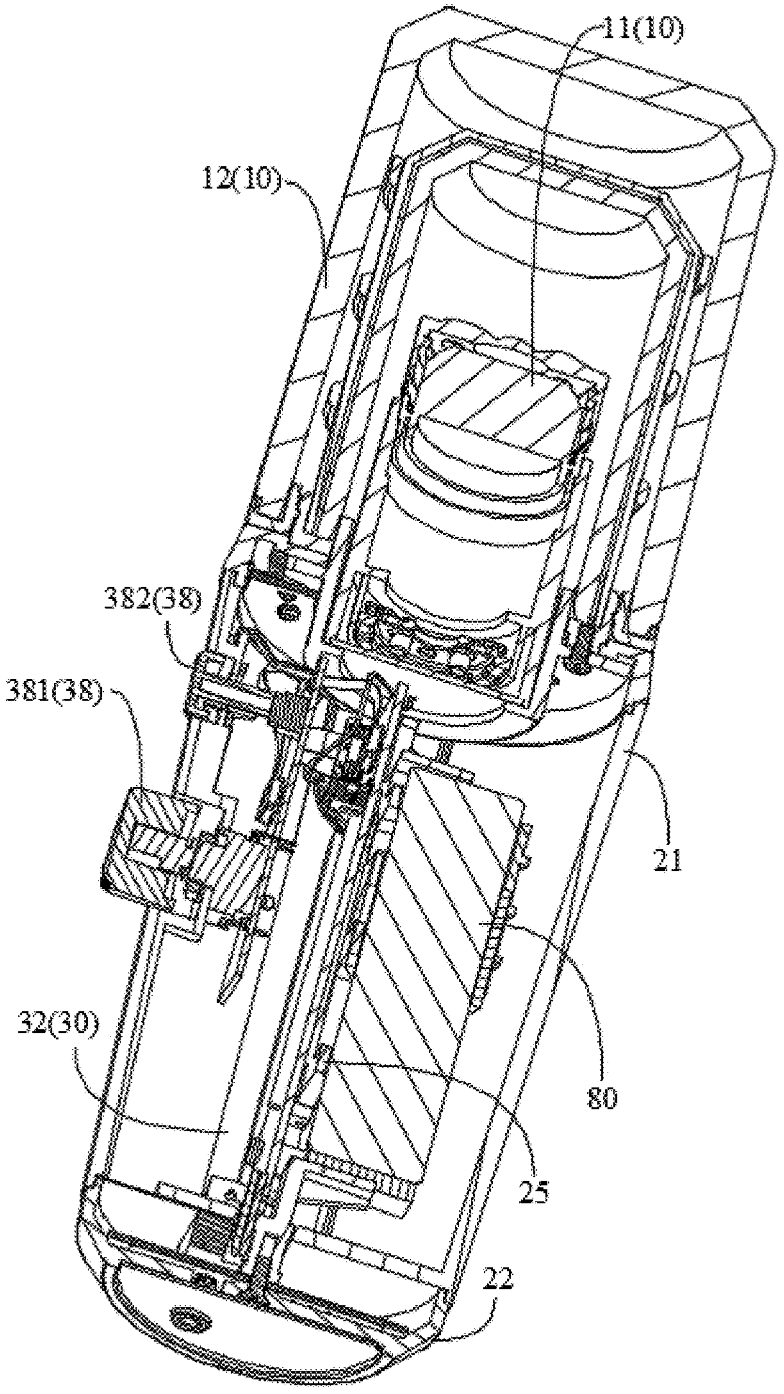
FIG. 27 is a cross sectional view of part of the desktop microphone of FIG. 1.
Figure 28:
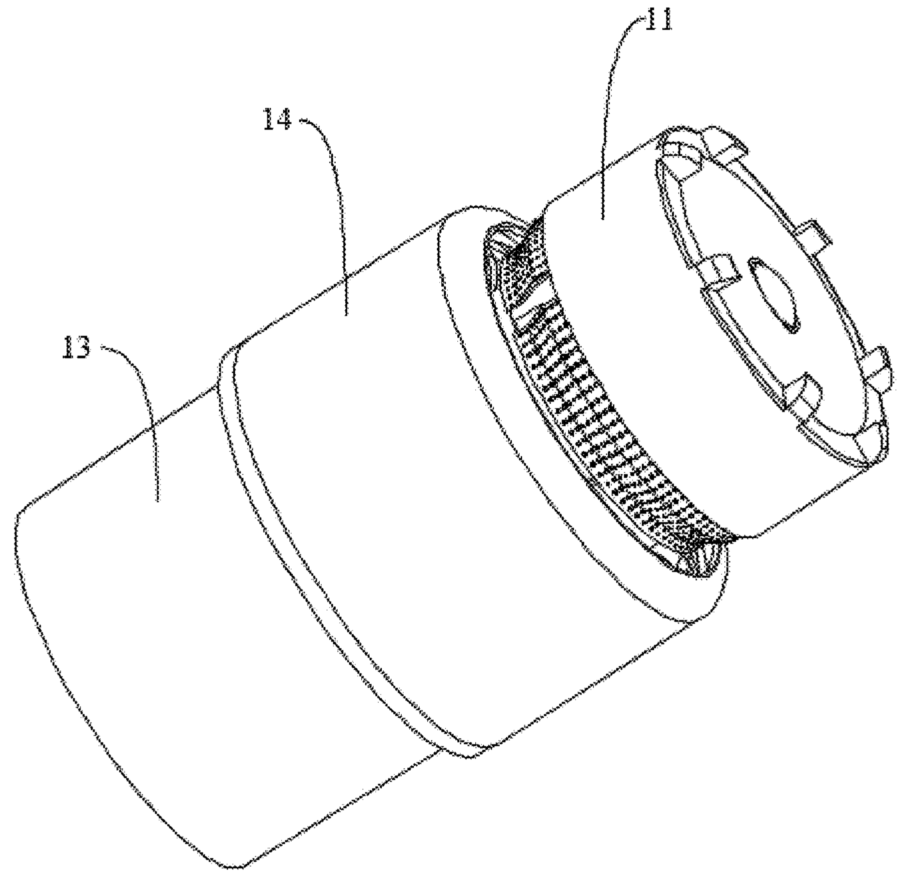
FIG. 28 is a schematic view showing a microphone head of the desktop microphone of FIG. 1.
Figure 29:
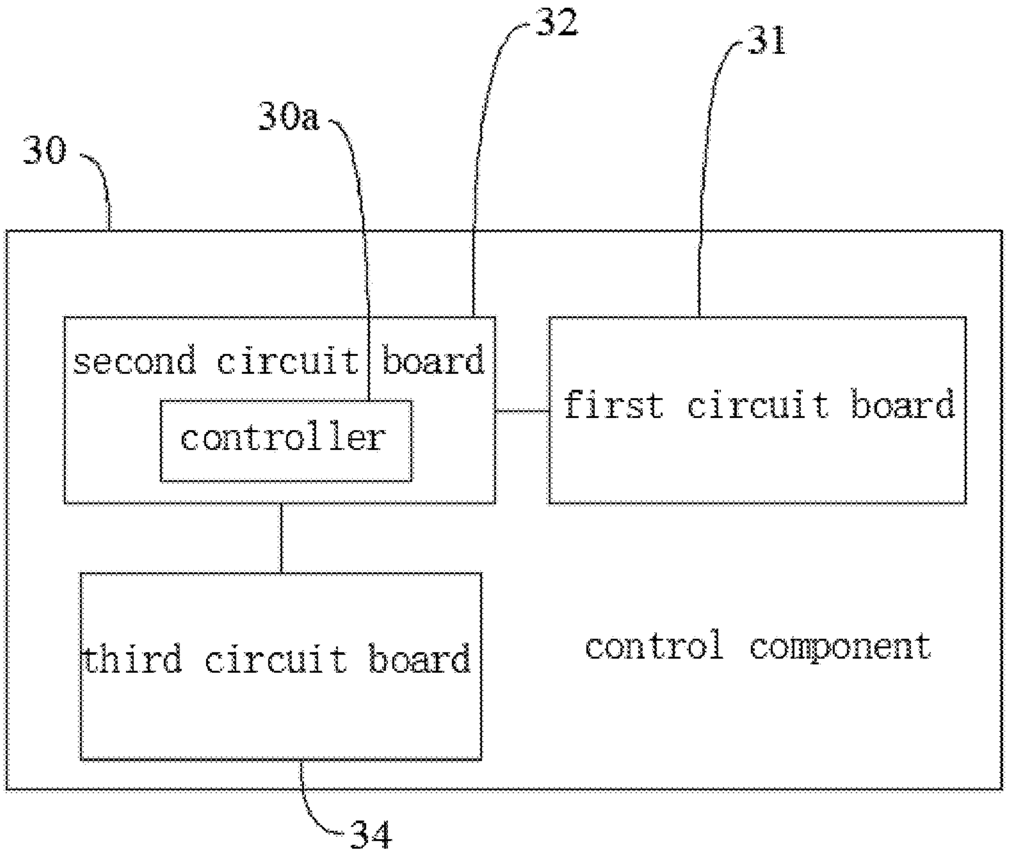
FIG. 29 is a circuit block diagram of the control component.
Figure 30:
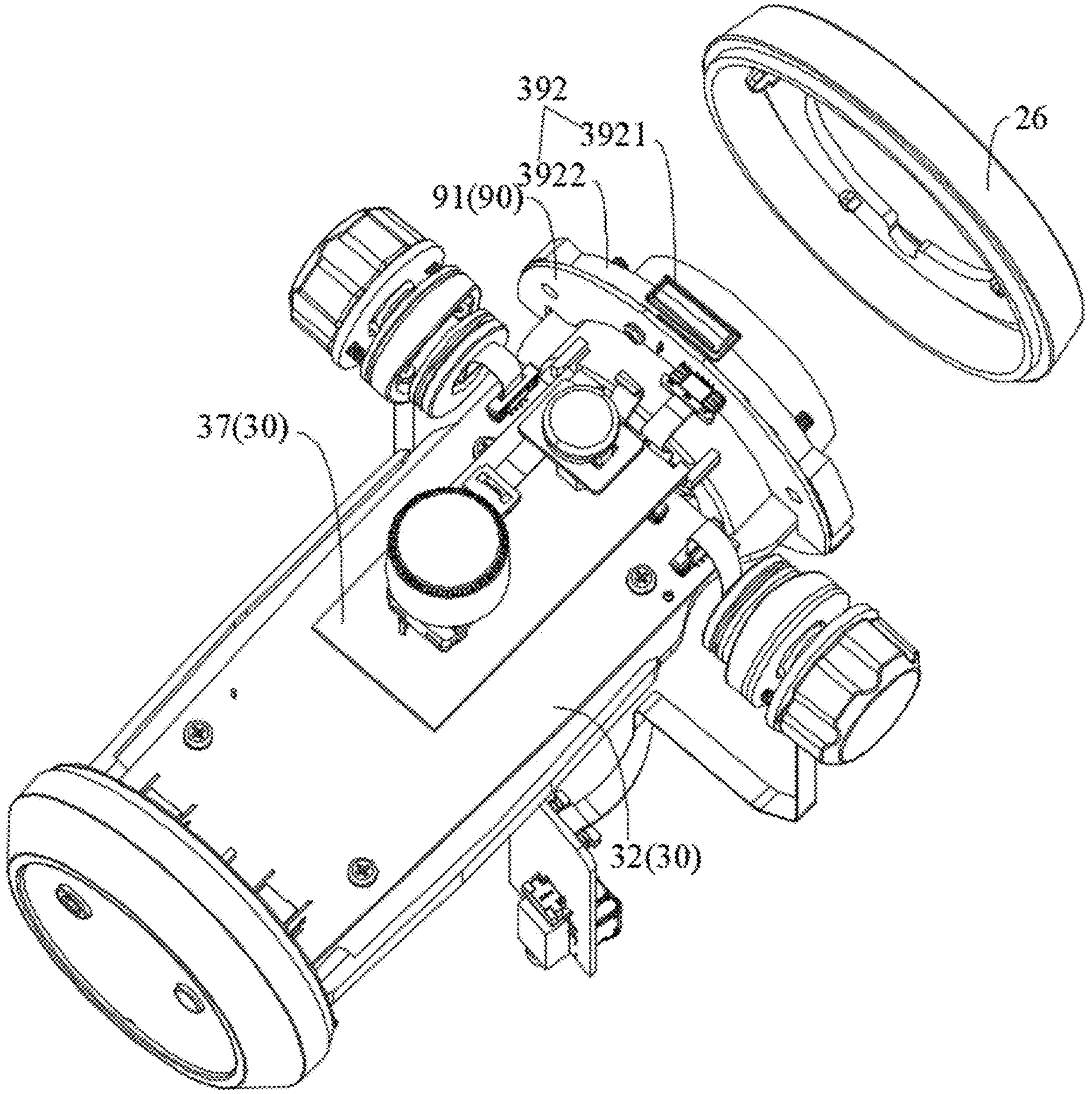
FIG. 30 is a partially exploded view of part of the desktop microphone of FIG. 1.
Figure 31:
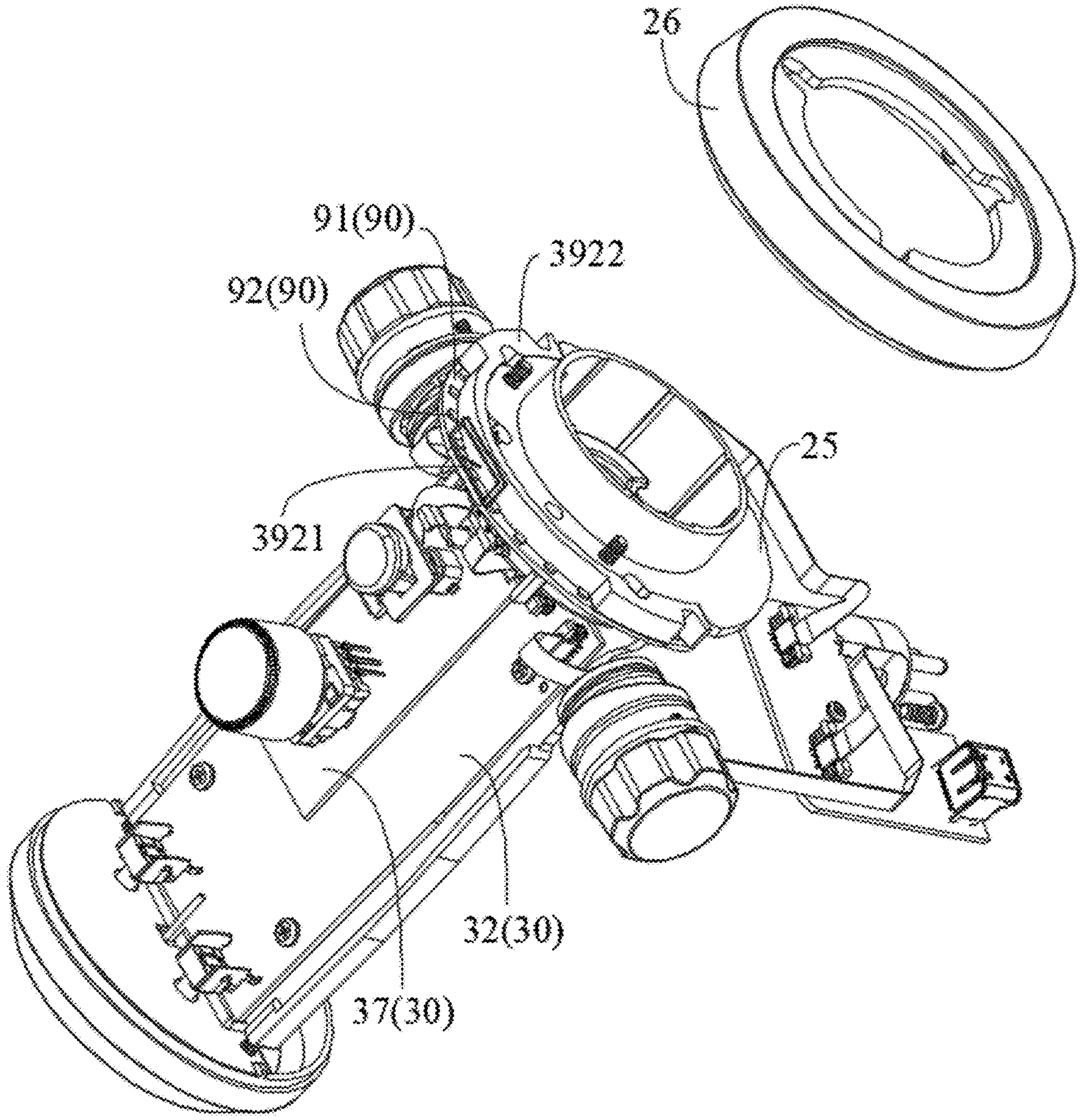
FIG. 31 is another view of FIG. 30.
Figure 32:
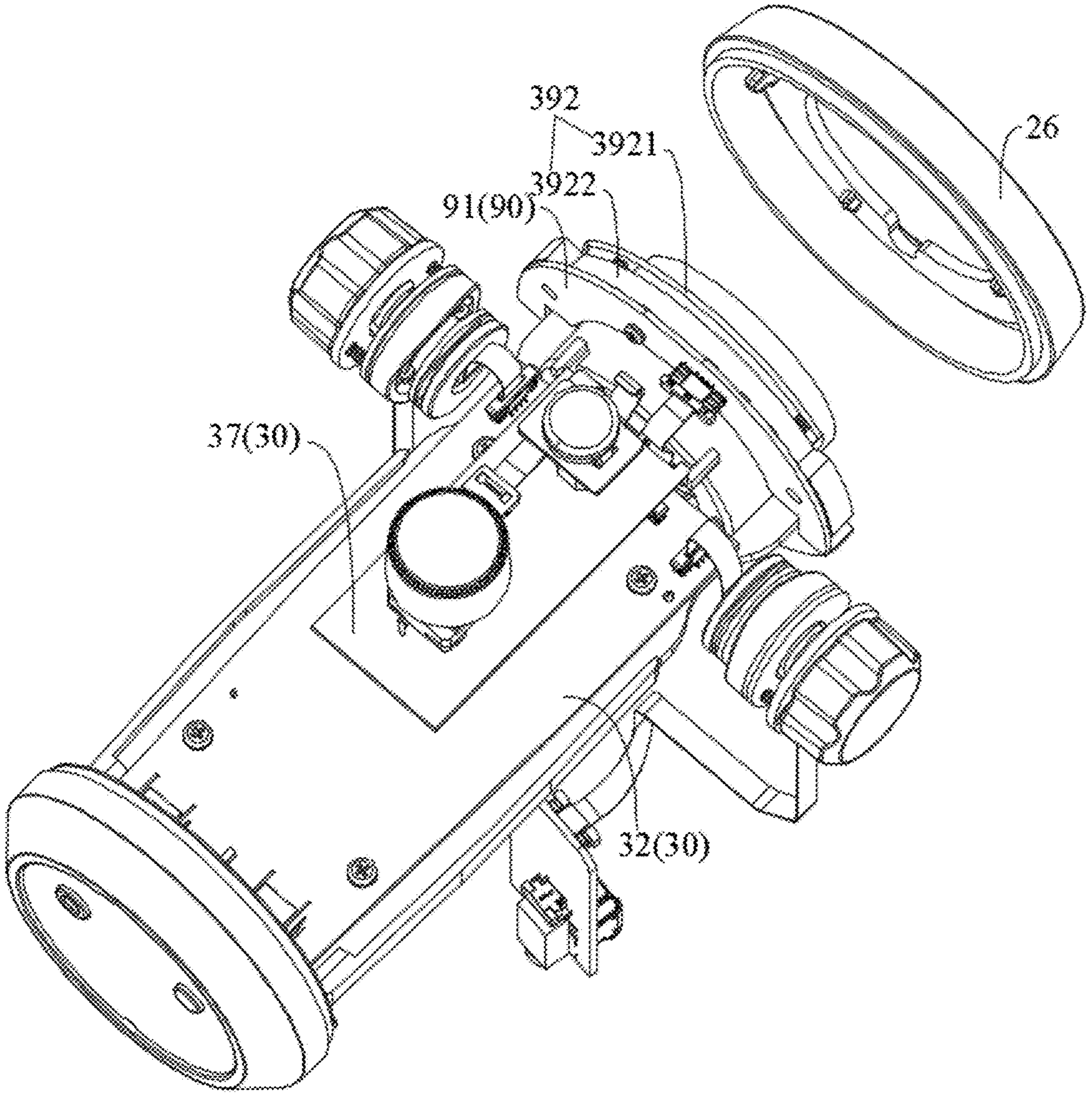
FIG. 32 is another partially exploded view of the desktop microphone of FIG. 1, showing a modified metal elastic body.
Figure 33:
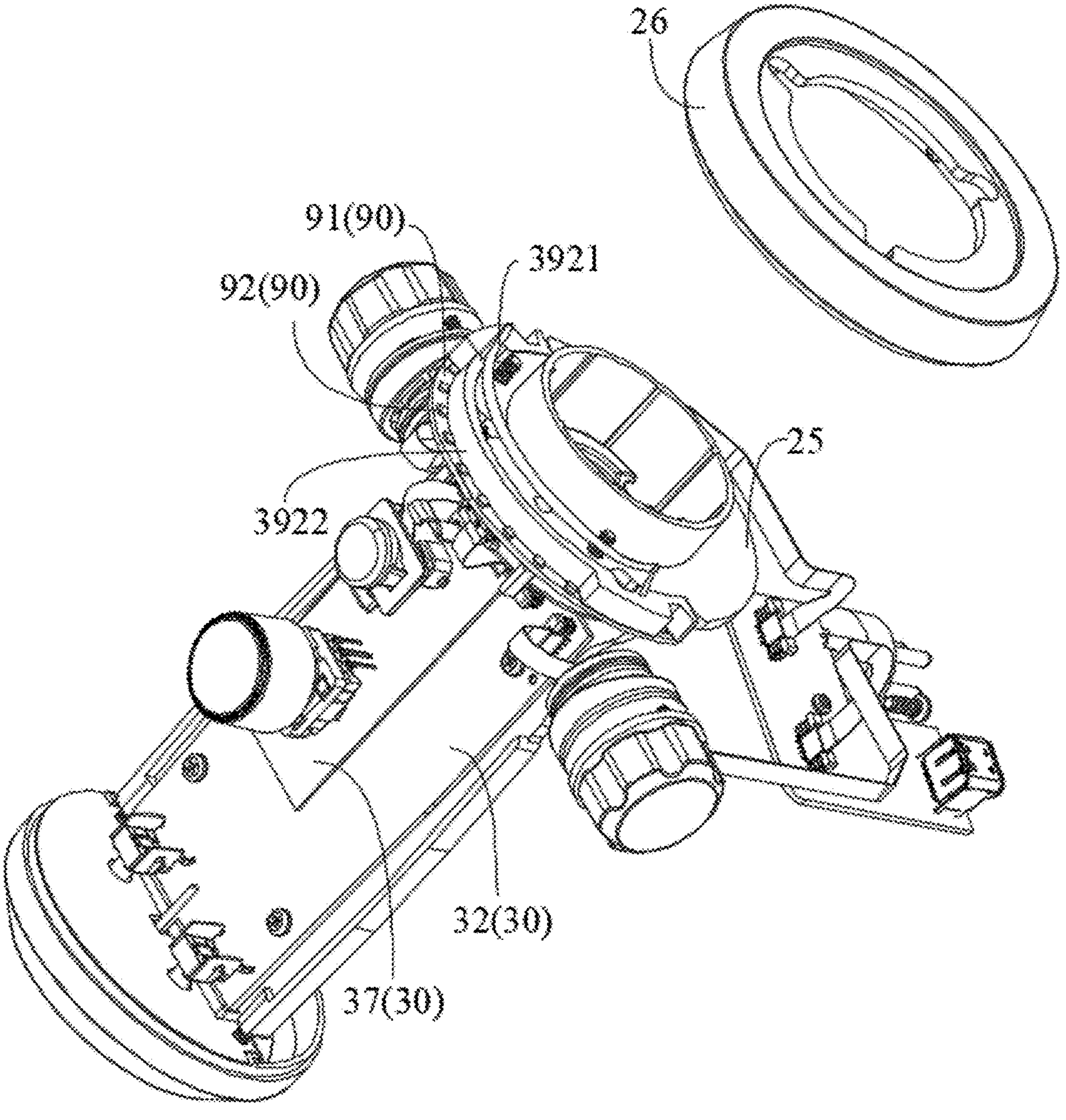
FIG. 33 is another view of FIG. 32.

It can be understood that the size of the touch area of the transparent member 26 depends on the projection area of the metal elastic body 3921 on the transparent member 26. As shown in FIGS. 26 and 27, the metal elastic body 3921 has a multi ring structure, and the area corresponding to the projection of the metal elastic body 3921 with the multi ring structure on the transparent member 26 is the touch area of the transparent member 26; as shown in FIGS. 28 and 29, the metal transparent member 26 has a circular arc structure, and the central angle corresponding to the circular arc structure can be greater than or equal to 90 degrees and less than or equal to 150 degrees. The area corresponding to the projection of the metal elastic body 3921 of this circular arc structure on the transparent member 26 is the touch area of the transparent member 26, at this time, the touch area is larger, which is more convenient for users to touch and operate.

The above descriptions are only preferred embodiments of the present disclosure, and are not intended to limit the patent scope of the present disclosure. Any equivalent structural transformation made by using the content of the specification and the drawings of the present disclosure under the invention idea of the present disclosure, directly or indirectly applied to other related technical fields, shall all be included in the scope of patent protection of the present disclosure.

What is claimed is:

1. A desktop microphone, comprising:

a housing assembly (20), comprising a shell (21) defining a first accommodating chamber (21*a*);

a support assembly (50), wherein the support assembly (50) comprises a first bracket (51) including a U-shaped bracket structure (511) and a port socket (512), the U-shaped bracket structure (511) comprises two first ends facing upwards and a second end opposite to the two first ends, the two first ends of the U-shaped bracket structure (511) being rotatably connected to the shell (21), and the port socket (512) being set at the second end of the U-shaped bracket structure (511); the U-shaped bracket structure (511) comprises a wire slot (511*a*), and the port socket (512) comprises a second accommodating chamber (512*a*) in communication with the wire slot (511*a*);

a control component (30), wherein the control component (30) comprises a first circuit board (32), and a second circuit board (34), the first circuit board (32) is arranged in the first accommodating chamber (21*a*), the second circuit board (34) is arranged in the second accommodating chamber (512*a*); and an electrical connector (60), wherein the electrical connector (60) is partially arranged in the wire slot (511*a*), one end of the electrical connector (60) is electrically connected to the second circuit board (34), the other end of the electrical connector (60) extends into the shell (21) and is electrically connected to the first circuit board (32).

2. The desktop microphone according to claim 1, wherein the two first ends of the U-shaped bracket structure (511) each have a first perforation (5111*a*), and the shell (21) has two second perforations (212*a*) corresponding to the two first perforations (5111*a*);

the U-shaped bracket structure (511) further includes two locking bolts (5112) and two locking nuts (5113), with each locking bolt (5112) extending one of the second perforations (212*a*) and a corresponding one of the first perforations (5111*a*), and each locking nut (5113) being connected to one of the locking bolts (5112);

each lock nut (5113) is configured to drive the corresponding locking bolt (5112) along an axis of the second perforations (212*a*) through rotation, thereby securing or loosening the shell (21) relative to the support assembly (50).

3. The desktop microphone according to claim 2, wherein the electrical connector (60) includes a flexible circuit board (61) arranged in the wire slot (511*a*), and each locking bolt (5112) is provided with a wire hole (5112*a*) that communicates with an interior of the shell (21) and the wire slot (511*a*), one end of the flexible circuit board (61) extends the wire hole (5112*a*) and is electrically connected to the second circuit board (32), and the other end of the flexible circuit board (61) extends into the second accommodating chamber (512*a*) of the port socket (512) and is electrically connected to the second circuit board (34).

4. The desktop microphone according to claim 3, wherein the U-shaped bracket structure (511) further comprises a covering plate (5116), the wire slot (511*a*) is formed by concave inward from a surface of the U-shaped bracket structure (511), and the covering plate (5116) covers the wire slot (511*a*).

5. The desktop microphone according to claim 3, wherein the control component (30) further includes an electrical connection terminal (391) set on and electrically connected to the second circuit board (32), the flexible circuit boards (61) is electrically connected to the second circuit board (32) through the electrical connection terminal (391).

6. The desktop microphone according to claim 2, wherein the U-shaped bracket structure (511) further includes two elastic shims (5114), and the locking bolt (5112) has a T-shaped structure, each of the elastic shims (5114) is located between a head of the corresponding locking bolt (5112) and an outer surface of the shell (21), when the user rotates the locking nut (5113), which drives the locking bolt (5112) to move away from the locking nut 5113 along the axis of the second perforation (212*a*), the head of the locking bolt (5112) releases the elastic shim (5114), thus the shell (21) changes to an unlocked state, then the shell (21) is loosened relative to the support assembly (50).

7. The desktop microphone according to claim 1, wherein the control component (30) further comprises a third circuit board (35) located in the first accommodating chamber (21*a*), and the surface of the third circuit board (35) is provided with a circular conductive plate (36), and the third circuit board (35) is electrically connected to the first circuit board (32);

the electrical connector (60) includes a conductive pin (62) and a wire (63); the conductive pin (62) passes through the U-shaped bracket structure (511) and contacts the circular conductive plate (36); the wire (63) is buried in the wire slot (511*a*), and one end of the wire is electrically connected to the conductive pin (62); the other end of the wire (63) extends into the second accommodating chamber (512*a*) of the port socket (512) and is electrically connected to the second circuit board (34).

8. The desktop microphone according to claim 7, further comprising a wired interface module (70) arranged in the port socket (512), the wired interface module (70) is electrically to the second circuit board (34), the circular conductive plate (36) is configured to maintain an electrical connection of the wired interface module (70) when the shell (21) rotates relative to the U-shaped bracket structure (511).

9. The desktop microphone according to claim 8, wherein the wired interface module (70) comprises at least one of a XLR interface, a Type-C interface, and an earphone interface electrically connected to the second circuit board (34).

10. The desktop microphone according to claim 8, wherein the desktop microphone defines a center line along a lengthwise direction, and the third circuit board (31) has a surface perpendicular to the center line of desktop microphone, and the surface has two opposing side edges; the transmitting unit (41) is located adjacent to one of the side edges, the receiving unit (42) is located adjacent to the other of the side edges;

the third circuit board (31) is provided with a perforation (31*b*), and the projection (24) is provided with a mounting hole (24*b*) corresponding to the perforation (31*b*); the desktop microphone further comprises a fixing member (94), which is pierced through the perforation (31*b*) and connected to the mounting hole (24*b*) to position the third circuit board (31) on the projection (24).

11. The desktop microphone according to claim 1, wherein the housing assembly (20) further comprises a mounting bracket (25), part of the mounting bracket (25) extends into the first accommodating chamber (21*a*), and part of the mounting bracket (25) is exposed to outside; and a light emitting assembly (90) and a transparent member (26) are provided on the mounting bracket (25), and the transparent member (26) covers the light emitting assembly (90) with an outer surface of the transparent member (26) being exposed outside.

12. The desktop microphone according to claim 11, further comprising a sound pickup assembly (10) arranged on the mounting bracket (25) away the shell (21) and the transparent member (26), the sound pickup assembly (10) comprises a microphone head (11) for capturing audio signals, and the sound pickup assembly (10) is located in a chamber separated from the light emitting assembly (90).

13. The desktop microphone according to claim 1, wherein the shell (21) comprises a bottom wall (211) and a surrounding wall (212) connected to the bottom wall (211), wherein the bottom wall (211) and the cover (22) jointly enclose to form a third accommodating chamber (23), the bottom wall (211) and the surrounding wall (212) jointly enclose to form the first accommodating chamber (21*a*);

the control component further comprises a third circuit board (31) located at least partially in the third accommodating chamber (23); and a wireless assembly (40) is provided on the third circuit board (31) and electrically connected to the first circuit board (31), and the wireless assembly (40) is used for wireless communication with an external device, to transmit audio signals from the desktop microphone to the external device and/or receive audio signals from the external device.

14. The desktop microphone according to claim 13, wherein the wireless assembly (40) comprises a transmitting unit (41) and a receiving unit (42) that are spaced apart and electrically connected to the third circuit board (31); the transmitting unit (41) is used for wireless communication with external devices to transmit audio signals from the desktop microphone to the external devices; the receiving unit (42) is used for wireless communication with the external devices to receive audio signals from the external devices.

15. The desktop microphone according to claim 14, wherein at least one of the transmitting unit (41) and the receiving unit (42) comprises a conductive circuit integrated in the third circuit board (31); or at least one of the transmitting unit (41) and the receiving unit (42) comprises a ceramic dielectric antenna mounted on the third circuit board (31); or at least one of the transmitting unit (41) and the receiving unit (42) comprises a metal antenna mounted on the third circuit board (31).

16. The desktop microphone according to claim 14, further comprising an inner support comprising a projection (24) made of metal material, at least part of the projection (24) is arranged in the third accommodating chamber (23), the projection (24) is in a long strip shape, the third circuit board (31) is connected to a side of the projection (24) and facing to the cover (22), and the transmitting unit (41) and the receiving unit (42) correspond to two sides of the projection (24).

17. The desktop microphone according to claim 1, wherein the support assembly (50) further comprises a second bracket (52) and a base (53), a length of the second bracket (52) is adjustable and one end is fixedly connected to the first bracket (51); the base (53) is detachably connected to the end of the second bracket (52) away from the first bracket (51).

18. The desktop microphone according to claim 17, wherein the second bracket (52) comprises a first pipe section (521), a second pipe section (522), a third pipe section (523), a fourth pipe section (524), a fifth pipe section (525), a sixth pipe section (526), and a seventh pipe section (527); a portion of the first pipe section (521) extends into the port socket (512) and is detachably connected to the U-shaped bracket structure (511);

the second pipe section (522) is located on a side of the first pipe section (521) away from the port socket (512), the third pipe section (523) is looped around both a periphery of the first pipe section (521) and a periphery of the second pipe section (522), and the third pipe section (523) is threaded with the second pipe section (522);

the fourth pipe section (524) is located on a side of the second pipe section (522) away from the first pipe section (521), and is fixedly connected with the second pipe section (522); the fifth pipe section (525) is looped around a periphery of the fourth pipe section (524) and is fixedly connected with the fourth pipe section (524); and the sixth pipe section (526) is looped around a periphery of a first part of the fifth pipe section (525) and is threaded with the first part of the fifth pipe section 525; the pipe section (527) is set around a periphery of the fourth pipe section (524) and a second part of the fifth pipe section (525), and the seventh pipe section (527) is threaded with the second part of the fifth pipe section (525), and the seventh pipe section (527) is connected to the base (53).

19. The desktop microphone according to claim 18, wherein at least one of the second pipe section (522), the third pipe section (523) and the sixth pipe section (526) has an anti slip pattern.

20. The desktop microphone according to claim 18, wherein a top surface of the port socket (512) is provided with a first slot (512*b*) for inserting the U-shaped bracket structure (511), and a bottom wall of the first slot (512*b*) is provided with a first insertion hole (512*c*) connected to the second accommodating chamber (512*a*);

a bottom surface of the port socket (512) is provided with a second slot (512*d*) for inserting the first pipe section (521), and a bottom wall of the second slot (512*d*) is provided with a second insertion hole (512*e*) connected to the second accommodating chamber (512*a*); part of the U-shaped bracket structure (511) inserted into the first slot (512*b*) is provided with a fourth threaded hole (5111*b*), and the first bracket (51) also includes a locking screw (513), at least part of an inner diameter of the first pipe section (521) is adapted to a radial size of the locking screw (513), and the locking screw (513) sequentially passes through the first pipe section (521), the second insertion hole (512*e*), and the first insertion hole (512*c*) to connect the first pipe section (521), the port socket (512), and the U-shaped bracket structure (511) as a whole.

* * * * *